(12) United States Patent
Messana et al.

(10) Patent No.: US 8,598,279 B2
(45) Date of Patent: *Dec. 3, 2013

(54) ADDUCTS USEFUL AS CURE COMPONENTS FOR ANAEROBIC CURABLE COMPOSITIONS

(75) Inventors: Andrew D. Messana, Newington, CT (US); Anthony F. Jacobine, Meriden, CT (US)

(73) Assignee: Henkel IP US LLC, Rocky Hill, CT (US)

(*) Notice: Subject to any disclaimer, the term of this patent is extended or adjusted under 35 U.S.C. 154(b) by 905 days.

This patent is subject to a terminal disclaimer.

(21) Appl. No.: 11/781,306

(22) Filed: Jul. 23, 2007

(65) Prior Publication Data

US 2009/0025874 A1    Jan. 29, 2009

(51) Int. Cl.
*C08F 8/30* (2006.01)
*C08F 8/06* (2006.01)
*C08L 23/26* (2006.01)

(52) U.S. Cl.
USPC ............... 525/327.6; 252/186.1; 252/186.42; 523/176; 156/327; 156/330.9; 156/332; 525/327.4; 525/327.5; 525/329.9; 525/330.5; 525/333.6; 525/376; 525/387

(58) Field of Classification Search
USPC ........... 252/186.1, 186.42; 523/176; 156/327, 156/330.9, 332; 525/327.4, 327.5, 327.6, 525/329.9, 330.5, 333.6, 376, 387
See application file for complete search history.

(56) References Cited

U.S. PATENT DOCUMENTS

| | | | | |
|---|---|---|---|---|
| 2,699,437 A | * | 1/1955 | D Alelio | 526/304 |
| 3,085,994 A | * | 4/1963 | Muskat | 526/272 |
| 3,218,305 A | | 11/1965 | Krieble | |
| 3,451,979 A | * | 6/1969 | Muskat | 526/272 |
| 3,553,140 A | * | 1/1971 | Lindner | 252/186.3 |
| 3,625,930 A | | 12/1971 | Toback | 260/89 |
| 3,679,640 A | * | 7/1972 | Moore et al. | 525/376 |
| 3,970,505 A | | 7/1976 | Hauser | 526/217 |
| 4,083,835 A | * | 4/1978 | Pohlemann et al. | 525/327.5 |
| 4,174,331 A | | 11/1979 | Myles | 260/29 |
| 4,180,640 A | | 12/1979 | Melody | 526/323 |
| 4,259,462 A | | 3/1981 | Nakano et al. | 525/263 |
| 4,287,330 A | | 9/1981 | Rich | 526/270 |
| 4,321,349 A | | 3/1982 | Rich | 526/270 |
| 4,401,793 A | * | 8/1983 | Chiao et al. | 525/285 |
| 5,060,380 A | * | 10/1991 | Fujikawa | 30/200 |
| 5,411,988 A | | 5/1995 | Bockow | 514/560 |

(Continued)

FOREIGN PATENT DOCUMENTS

| | | | |
|---|---|---|---|
| DE | 1 817 989 A1 | 12/1976 | C09J 5/00 |
| DE | 20 806 701 A1 | 8/1978 | C08L 33/08 |

(Continued)

OTHER PUBLICATIONS

Lee, Direct Polymer Reaction of Poly(styrene-co-maleic anhydride): Polymeric Imidization, Journal of Applied Polymer Science, vol. 71, 1187-1196 (1999).*

(Continued)

*Primary Examiner* — Robert C Boyle
(74) *Attorney, Agent, or Firm* — Steven C. Bauman

(57) ABSTRACT

The present invention relates to novel polymer-bound adducts useful as cure components for anaerobic curable compositions. The compositions are particularly useful as adhesives and sealants.

18 Claims, 7 Drawing Sheets

(56) References Cited

U.S. PATENT DOCUMENTS

| | | | |
|---|---|---|---|
| 5,605,999 A | | 2/1997 | Chu .................................. 528/24 |
| 5,811,473 A | | 9/1998 | Ramos ........................... 523/176 |
| 5,922,814 A | * | 7/1999 | Tropsch et al. ............. 525/326.9 |
| 6,313,197 B1 | * | 11/2001 | Symes et al. ................... 523/201 |
| 6,391,993 B1 | | 5/2002 | Attarwala ...................... 526/261 |
| 6,583,289 B1 | | 6/2003 | McArdle ........................ 548/123 |
| 6,835,762 B1 | * | 12/2004 | Kelmarczyk et al. .......... 523/176 |
| 6,897,277 B1 | | 5/2005 | Klemarczyk .................. 526/215 |
| 6,958,368 B1 | | 10/2005 | Messana ........................ 523/176 |

FOREIGN PATENT DOCUMENTS

| | | |
|---|---|---|
| JP | 06041509 A | 2/1994 |
| JP | 07-308757 | 11/1995 |
| JP | 2007099903 A | 4/2007 |

OTHER PUBLICATIONS

Mageli, Ind. Eng. Chem., 1966, 58 (3), pp. 25-32.*

International Search Report mailed Feb. 24, 2007 by the Korean Intellectual Property Office for International Patent Application No. PCT/US2008/00885.

Lee, S. et al. "Direct Polymer Reaction Of Poly(styrene-co-maleic anhydride): Polymeric Imidiation", *Journal of Applied Polymer Science*, 71(7), pp. 1187-1196, (1999).

Ahn, T. et al. "Studies on the Styrenic Polymers(1), Imidization of Poly(styrene-co-maleic anhydrides) and Their Thermal Properties", Journal of the Korean Industrial and Engineering Chemistry, 3(1), pp. 179-187, (1992) . . . English Abstract.

Rich, R.D., "Anaerobic Adhesives", *Handbook of Adhesive Technology*, vol. 29, 467-79, A. Pizzi, eds., Marcel Dekker, Inc., New York (1994).

* cited by examiner

A

B

Route A

Step 1

Step 2

Route B

Step 1

Step 2

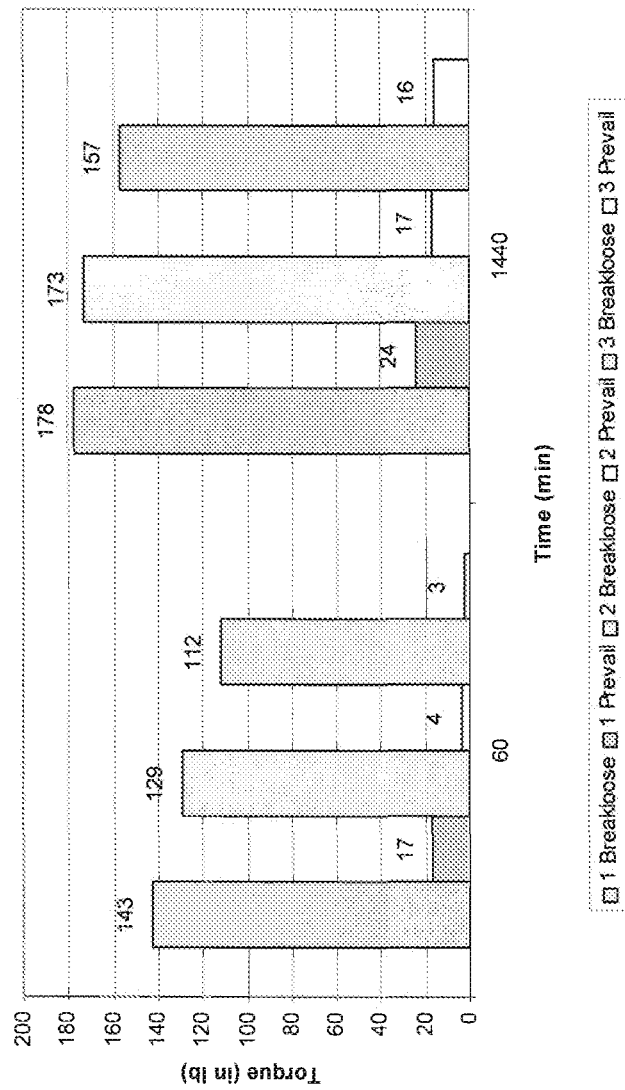

ADDUCTS USEFUL AS CURE COMPONENTS FOR ANAEROBIC CURABLE COMPOSITIONS

BACKGROUND OF THE INVENTION

1. Field of the Invention

The present invention relates to novel adducts useful as cure components for anaerobic curable compositions. The compositions are particularly useful as adhesives and sealants.

2. Brief Description of Related Technology

Anaerobic adhesive compositions generally are well known. See e.g. R. D. Rich, "Anaerobic Adhesives" in *Handbook of Adhesive Technology*, 29, 467-79, A. Pizzi and K. L. Mittal, eds., Marcel Dekker, Inc., New York (1994), and references cited therein. Their uses are legion and new applications continue to be developed.

Conventional anaerobic adhesives ordinarily include a free-radically polymerizable acrylate ester monomer, together with a peroxy initiator and an inhibitor component. Oftentimes, such anaerobic adhesive compositions also contain accelerator components to increase the speed with which the composition cures.

Desirable anaerobic cure-inducing compositions to induce and accelerate cure may include one or more of saccharin, toluidines, such as N,N-diethyl-p-toluidine ("DE-p-T") and N,N-dimethyl-o-toluidine ("DM-o-T"), acetyl phenylhydrazine ("APH"), maleic acid, and quinones, such as napthaquinone and anthraquinone. See e.g. U.S. Pat. Nos. 3,218,305 (Krieble), U.S. Pat. No. 4,180,640 (Melody), U.S. Pat. No. 4,287,330 (Rich) and U.S. Pat. No. 4,321,349 (Rich).

Saccharin and APH are used as standard cure accelerator components in anaerobic adhesive cure systems. The LOCTITE-brand anaerobic adhesive products currently available from Henkel Corporation use either saccharin alone or both saccharin and APH in most of its anaerobic adhesives. These components however have come under regulatory scrutiny in certain parts of the world, and thus efforts have been undertaken to identify candidates as replacements.

Examples of other curatives for anaerobic adhesives include thiocaprolactam (e.g., U.S. Pat. No. 5,411,988) and thioureas [e.g., U.S. Pat. No. 3,970,505 (Hauser) (tetramethyl thiourea), German Patent Document Nos. DE 1 817 989 (alkyl thioureas and N,N'-dicyclohexyl thiourea) and 2 806 701 (ethylene thiourea), and Japanese Patent Document No. JP 07-308,757 (acyl, alkyl, alkylidene, alkylene and alkyl thioureas)], certain of the latter of which had been used commercially up until about twenty years ago.

Loctite (R&D) Ltd. discovered a new class of materials—trithiadiaza pentalenes—effective as curatives for anaerobic adhesive compositions. The addition of these materials into anaerobic adhesives as a replacement for conventional curatives (such as APH) surprisingly provides at least comparable cure speeds and physical properties for the reaction products formed therefrom. [See U.S. Pat. No. 6,583,289 (McArdle).]

U.S. Pat. No. 6,835,762 (Klemarczyk) provides an anaerobic curable composition. The composition is based on a (meth)acrylate component with an anaerobic cure-inducing composition substantially free of acetyl phenyl hydrazine and maleic acid and an anaerobic cure accelerator compound having the linkage —C(=O)—NH—NH— and an organic acid group on the same molecule, provided the anaerobic cure accelerator compound excludes 1-(2-carboxyacryloyl)-2-phenylhydrazine. The anaerobic cure accelerator is embraced by.

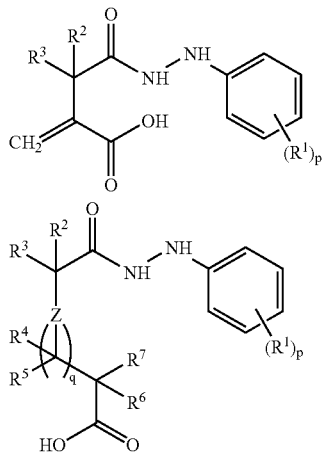

where $R^1$-$R^2$ are each independently selected from hydrogen and $C_{1-4}$; Z is a carbon-carbon single bond or carbon-carbon double bond; q is 0 or 1; and p is an integer between 1 and 5, examples of which are 3-carboxyacryloyl phenylhydrazine, methyl-3-carboxyacryloyl phenylhydrazine, 3-carboxypropanoyl phenylhydrazine, and methylene-3-carboxypropanoyl phenylhydrazine.

U.S. Pat. No. 6,897,277 (Klemarczyk) provides an anaerobic curable composition. This composition is based on a (meth)acrylate component with an anaerobic cure-inducing composition substantially free of saccharin and an anaerobic cure accelerator compound within the following structure

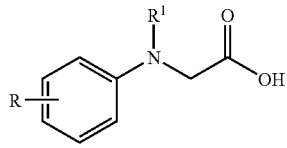

where R is selected from hydrogen, halogen, alkyl, alkenyl, hydroxyalkyl, hydroxyalkenyl, carboxyl, and sulfonato, and $R^1$ is selected from hydrogen, alkyl, alkenyl, hydroxyalkyl, hydroxyalkenyl, and aralkyl, an example of which is phenyl glycine and N-methyl phenyl glycine.

U.S. Pat. No. 6,958,368 (Messana) provides an anaerobic curable composition. This composition is based on a (meth)acrylate component with an anaerobic cure-inducing composition substantially free of saccharin and within the following structure

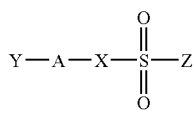

where Y is an aromatic ring, optionally substituted at up to five positions by $C_{1-6}$ alkyl or alkoxy, or halo groups; A is C=O, S=O or O=S=O; X is NH, O or S and Z is an aromatic ring, optionally substituted at up to five positions by $C_{1-6}$ alkyl or alkoxy, or halo groups, or Y and Z taken together may join to the same aromatic ring or aromatic ring system, provided that when X is NH, o-benzoic sulfimide is excluded from the structure. Examples of the anaerobic cure accelerator compound embraced by the structure above include 2-sulfobenzoic acid cyclic anhydride, and 3H-1,2-benzodithiol-3-one-1,1-dioxide.

Notwithstanding the state of the art, there is an on-going desire to find alternative technologies for anaerobic cure accelerators to differentiate existing products and provide supply assurances in the event of shortages or cessation of supply of raw materials. Moreover, since certain of the raw materials used in the anaerobic cure inducing composition have to one degree or another come under regulatory scrutiny, alternative components would be desirable. Accordingly, it would be desirable to identify new materials that function as cure components in the cure of anaerobically curable compositions.

SUMMARY OF THE INVENTION

The present invention provides novel adducts useful as cure components for anaerobic curable compositions. The components are adducts of a heteroatom-containing compound and copolymers of a latent carboxylic acid and one or more of styrene and substituted derivatives thereof, vinyl ether, polyalkyene, (meth)acrylate ester and combinations thereof which may optionally be terminated with cumene. Thus, the novel adducts are polymer-bound anaerobic cure components, such as accelerators, initiators or peroxides, useful in anaerobic cure systems.

The addition of these adducts into anaerobic curable compositions as a replacement for some or all of the amount of conventional anaerobic cure components (such as a toluidine, APH and/or CHP) surprisingly provides at least comparable cure speeds and physical properties for the reaction products formed therefrom, as compared with those observed from conventional anaerobic curable compositions. As such, these materials provide many benefits to anaerobic adhesive compositions including: being of a high molecular weight, solid component and thus reducing the tendency for volatilization; oftentimes soluble in the amounts ordinarily used in anaerobic adhesive compositions; a replacement for conventional anaerobic cure components, which have a less scrutinized regulatory profile; and a promotor for stability of the anaerobic adhesive compositions in which they are used.

Thus, this invention also provides anaerobic curable compositions prepared with such adducts as cure accelerators and a (meth)acrylate components methods of preparing and using the inventive anaerobic cure accelerators as well as reaction products of the inventive anaerobic curable compositions.

The present invention will be more fully appreciated by a reading of the "Detailed Description of the Invention", and the illustrative examples which follow thereafter.

BRIEF DESCRIPTION OF THE FIGURES

FIG. 7 depicts a bar chart of breakloose and prevail strengths on steel threaded fasteners of a control composition and two within the scope of the present invention that uses different blocked polymer-bound phenyl hydrazides.

DETAILED DESCRIPTION OF THE INVENTION

Figure 1:
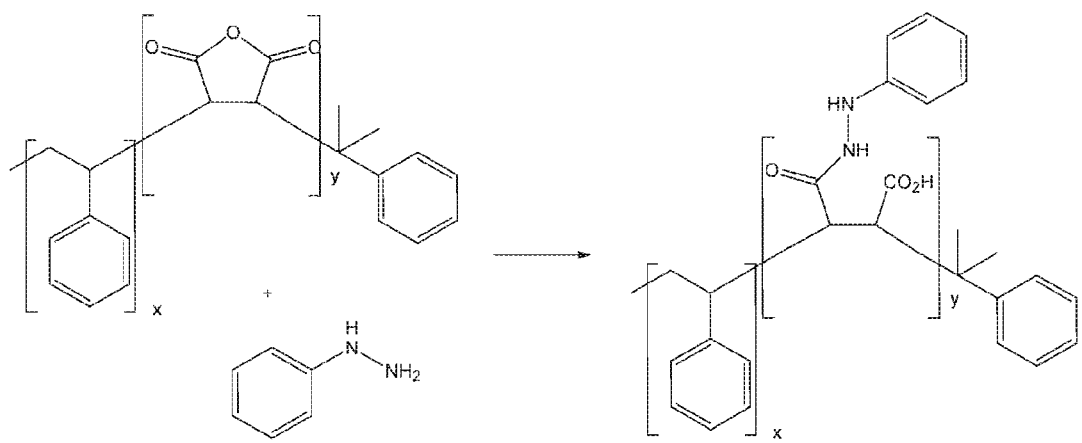
FIGS. 1A and 1B depict a synthesis of a novel adduct within the scope of the invention useful as an anaerobic cure component.
Figure 1:
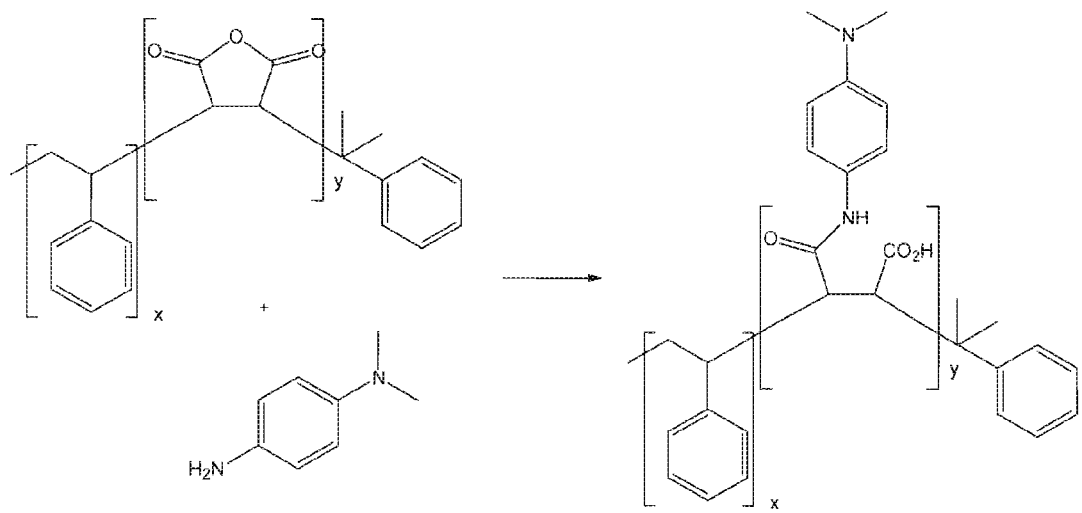

The present invention provides novel adducts useful as cure components for anaerobic curable compositions. The cure components are adducts of a heteroatom-containing compound and copolymers of a latent carboxylic acid and one or more of styrene and substituted derivatives thereof, vinyl ether, polyalkyene, (meth)acrylate ester and combinations thereof, which may optionally be terminated with cumene.

The adduct of a heteroatom-containing compound and a copolymer of a latent carboxylic acid and one or more of styrene and substituted derivatives thereof, vinyl ether, polyalkyene, (meth)acrylate ester and combinations thereof, includes a number of variables. For instance, the copolymer may be terminated with cumene. In addition, the styrene and substituted derivatives thereof, vinyl ether, polyalkyene, (meth)acrylate ester and combinations thereof, may be a substituted derivative thereof, for instance substituted by one or more of halogen, alkyl, alkenyl, hydroxyl alkyl, hydroxyl alkenyl, or carboxyl. And of course the heteroatom itself and the heteroatom-containing compound may differ.

In one embodiment, the adduct is a copolymer of (a) a latent carboxylic acid, such as maleic acid anhydride, and a residue selected from styrene, vinyl ether, polyalkyene, (meth)acrylate ester and combinations thereof, reacted with (b) a heteroatom-containing compound reactive with the maleic acid anhydride to form an adduct between the maleic acid anhydride and the heteroatom-containing compound, which copolymer is optionally terminated by a cumene residue.

In another embodiment, the adduct is a copolymer of (a) a latent carboxylic acid, such as a (meth)acryloyl halide (for instance, where the halide is chlorine or bromine) and a residue selected from styrene, vinyl ether, polyalkyene, (meth)acrylate ester and combinations thereof, reacted with (b) a heteroatom-containing compound reactive with the acryloyl halide to form an adduct between the (meth)acryloyl halide and the heteroatom-containing compound, which copolymer is optionally terminated by a cumene residue.

The heteroatom-containing adduct ordinarily contains a linkage selected from one of —C(=O)—NH—NH—, —C(=O)—NH—, —C(=O)—O, —C(=O)—OH, —O(=O)—O—O—$R^3$, —C(=O)—NH—$SO_2$—, —C(=O)—N(OH)—$SO_2$—, —C(=O)—O—$SO_2$—, or —C(=O)—S—$SO_2$—, such as —C(=O)—NH—NH—Ar, —(=O)—NH—NH—R, —O(=O)—NH—NH—$SO_2$—Ar, —C(=O)—NH—NH—$SO_2$—R, —C(=O)—S—Ar—$NR^1R^2$, —C(=O)—NH—Ar—$NR^1R^2$ or —C(=O)—O—Ar—$NR^1R^2$, where Ar is an aromatic group and R, $R^1$, $R^2$ and $R^3$ are each individually selected from H, alkyl having from 1 to about 8 carbon atoms, alkenyl having from 2 to about 8 carbon atoms and aryl having from 6 to about 16 carbon atoms.

The heteroatom-containing compound that is reactive with the latent carboxylic acid [such as maleic acid anhydride or (meth)acryloyl halide] accelerates the rate of anaerobic cure in anaerobically curable compositions.

The heteroatom-containing compound reactive with the latent carboxylic acid [such as maleic acid anhydride or (meth)acryloyl halide] may be selected from nitrogen-containing compounds, such as amines or arylhydrazines, amino-substituted toluidines, hydroxyl-substituted toluidines or mercapto-substituted toluidines, and combinations thereof, where the toluidine may be o-, m-, or p-substituted.

The copolymer should have a molecular weight of at least 1,000 dalton, but less than 15,000 dalton.

The copolymer may be embraced by the nominal structure:

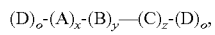

where A is a residue selected from styrene or substituted styrene, an acrylate ester, a vinyl ether and a polypropylene; B is a residue of an adduct formed from a latent carboxylic acid (such as maleic acid anhydride or (meth)acryloyl halide) and a heteroatom-containing compound; C is an optional residue as defined by A, and D is a cumene residue; $x+y+z=100\%-(o+o')$, and o and o'=0 or 1, representing the presence or absence of a cumene residue unit. For instance, x is between 1 and 99 mole %, such as between 49 and 85 mole %, and y is between 1 and 99 mole %, such as between 15 and 51 mole %. The value of x to the value of y may be from two times to ninety-nine times or x and y may have about the same value. The value of y to the value of x may be from two to ninety-nine times or y and x may have about the same value. The value of optional residue C where z is between 1 and 99 mole %, such as between 49 and 85 mole %, and y is between 1 and 99 mole %, such as between 15 and 51 mole %. The value of z to the value of y may be from two times to ninety-nine times or z and y may have about the same value. The value of y to the value of z may be from two to ninety-nine times or y and z may have about the same value. In addition, and more specifically, an anhydride functional copolymer, such as poly(styrene-co-maleic anhydride), may be used that is rich in anhydride, such as maleic anhydride.

The copolymer may be a random copolymer, a block copolymer or a graft copolymer.

For instance, the copolymer may be represented more specifically by

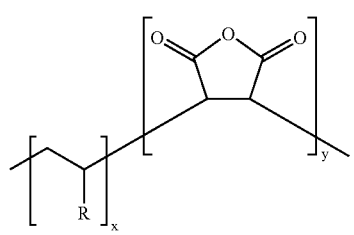

such as where R may be selected from hydrogen, linear alkylene and halogenated or alkoxylated derivatives thereof, branched alkylene and halogenated or alkoxylated derivatives thereof, and cycloalkylene and halogenated or alkoxylated derivatives thereof, aryl and derivatives thereof, and x and y are as defined above. For instance, the copolymer may be represented more specifically by

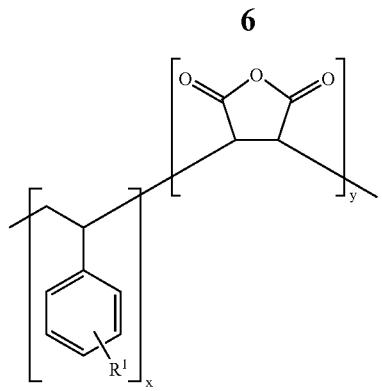

such as where $R^1$ may be selected from may be selected from halogen, hydroxyl, carboxyl, alkyl, alkenyl, alkoxy or alkenoxy, and x and y are as defined above.

Or, the copolymer may be represented by the cumyl terminated version of A, as shown below as structure A2.

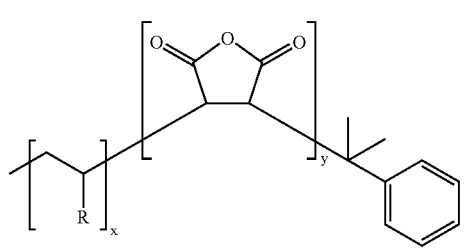

such as where R, x and y are as defined above. For instance, the copolymer may be represented more specifically by

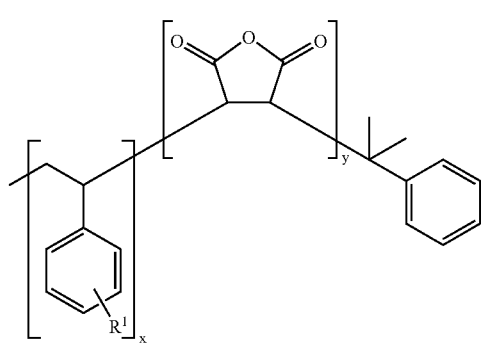

such as where $R^1$, x and y are as defined above.

Alternatively, the copolymer may be represented by

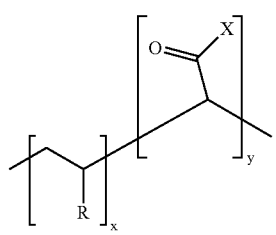

such as where R, x and y are as defined above, and X may be selected from halogen, hydroxyl or amine.

Or, the copolymer may be represented by

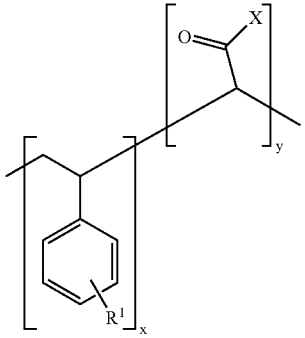

such as where $R^1$, X, x and y are as defined above.

Alternatively, the copolymer may be represented by the cumyl terminated version of B, as shown below as structure B2.

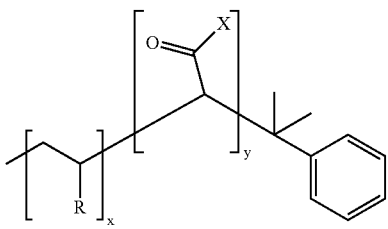
B2 such as where R, x and y, and X are as defined above. For instance, the copolymer may be represented more specifically by

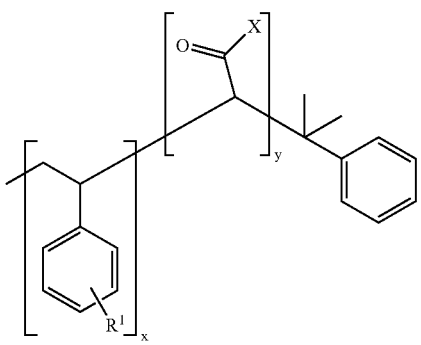
B3 where $R^1$, X and x and y are as defined above.

Alternatively, the copolymer may be represented by

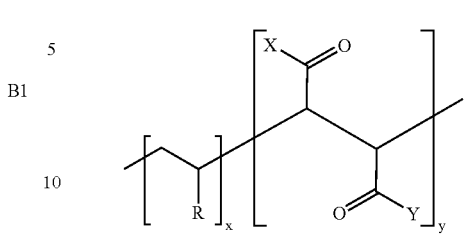
B1 such as where $R^1$, X, x and y are as defined above, and Y is the same or different than X, though selected from the same possibilities.

Or, the copolymer may be represented more specifically by

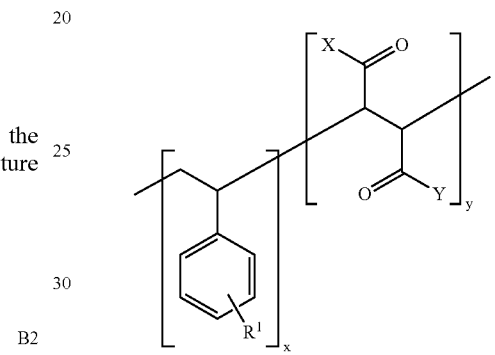
C1

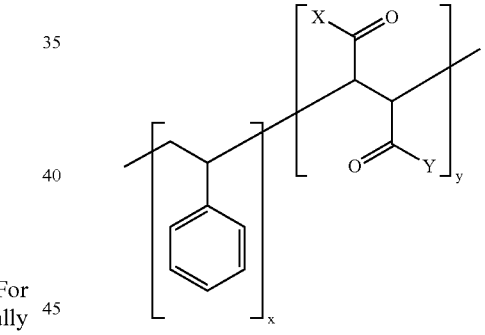
C2 such as where $R^1$, X, x and y are as defined above.

Alternatively, the copolymer may be represented by the cumyl terminated version of C, as shown below as structure C3.

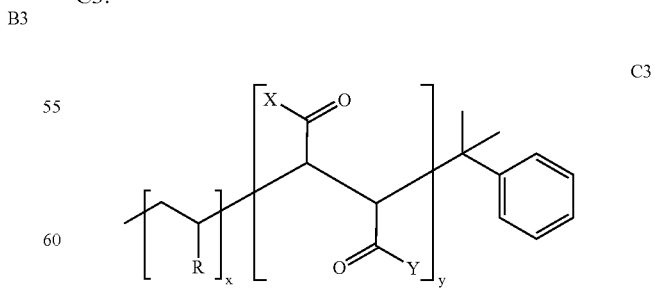
C3 where R, X, Y and x and y are as defined above. For instance, the copolymer may be represented more specifically by the cumyl terminated version of C, as shown below as structure C4.

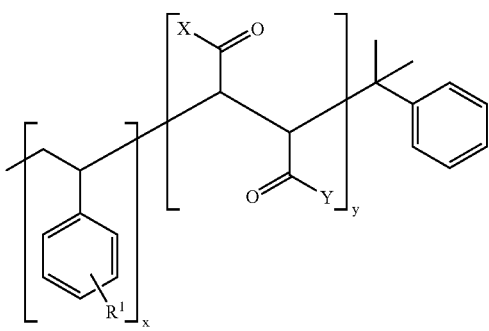
C4 where $R^1$, X, Y and x and y are as defined above

Or, the copolymer may be represented more specifically by the cumyl terminated version of C, as shown below as structure C5.

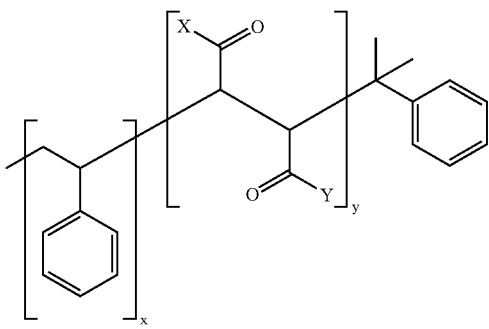
C5 where X, Y and x and y are as defined above.

Still alternatively, the copolymer may be represented by

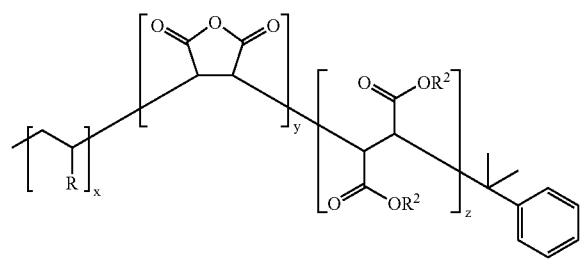
D where R is as defined above, $R^2$ is selected from H, alkyl, alkenyl, acetal, alkyl ether, such as

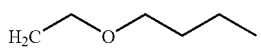

or alkenyl ether, and x and v are as defined above, and z+x+y=100%−(o+o'). For instance, the copolymer may be represented more specifically by

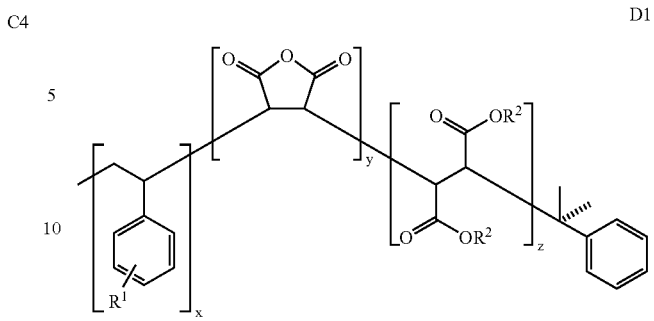
D1 such as where $R^1$, $R^2$ and x, y and z are as defined above. [A commercially available example of a copolymer within structure D is poly(styrene-co-maleic anhydride) partial 2-butoxyethyl ester, cumene terminated, average Mn ~2,500 by GPC, CAS No. 160611-50-7.]

Still alternatively, the copolymer may be represented more specifically by

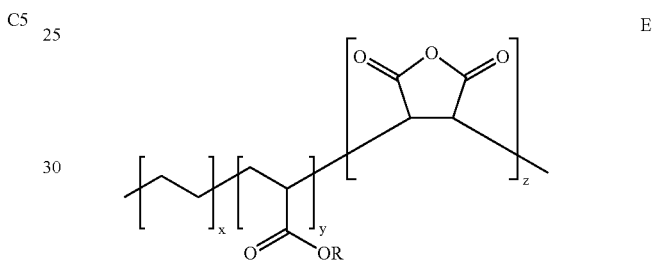
E where R, and x, y and z are as defined above with reference to structure D, for instance such as where R is ethyl as shown below

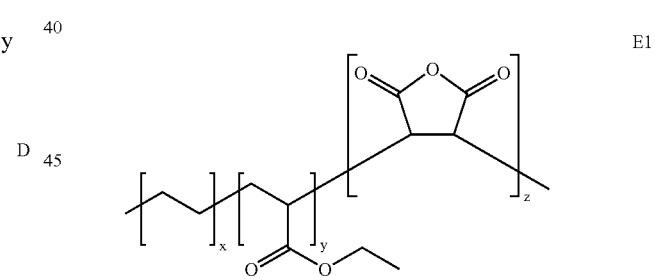
E1

[A commercially available example of a copolymer within structure E is poly(ethylene-co-ethyl acrylate-co-maleic anhydride), CAS No. 41171-14-6.]

Still alternatively, the copolymer may be represented more specifically by

F where R, and x and y are as defined above, for instance such as where R is methyl as shown below

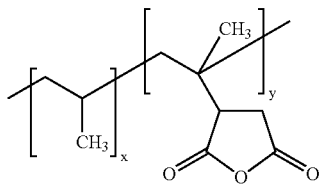

F1

[A commercially available example of a copolymer within structure F is polypropylene-graft-maleic anhydride pellets, maleic anhydride=0.6 wt. %, CAS No. 25722-45-6.]

Yet another alternative for the copolymer is one represented by

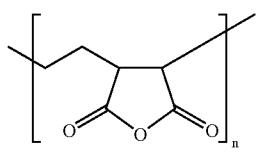

G where n is an integer between 10 and 1,000, such as between 100 to 500. [A commercially available example of a copolymer within structure G is poly(ethylene-co-maleic anhydride) average Mw ~100,000-500,000, powder, CAS No. 9006-26-2.]

Still yet another alternative for the copolymer is one represented by

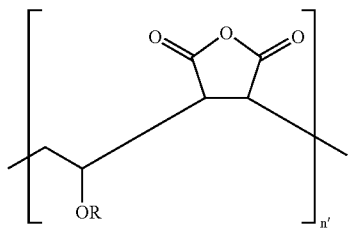

H where R is as defined above and n' is an integer between 10 and 2,000, such as between 300 to 1,000, such as where R is methyl as shown below

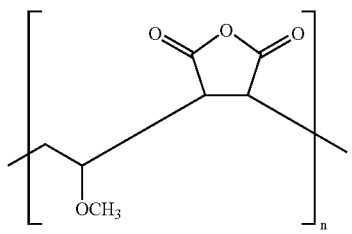

H1

[A commercially available example of a copolymer within structure H is poly(methyl vinyl ether-co-maleic anhydride) average Mw ~1,080,000, average Mn ~311,000, CAS No. 9011-16-9.]

Each of these polymers having either anhydride residues built into the backbone thereof or anhydride functional groups attached in a pending position from the backbone are known, and in some cases commercially available polymeric structures from Sigma-Aldrich Chemical, and are useful in the practice of the present invention.

Several adducts within the scope of the present invention include therefor that which is show in FIG. 1. Thus, structures I, J, K, and L are represented below.

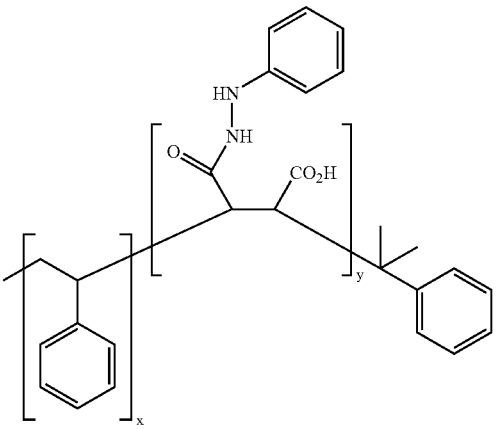

I

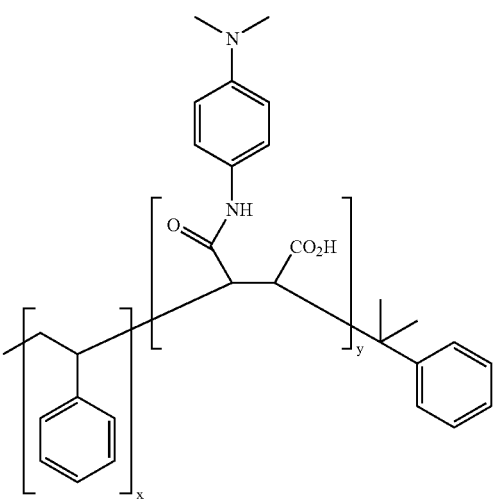

J

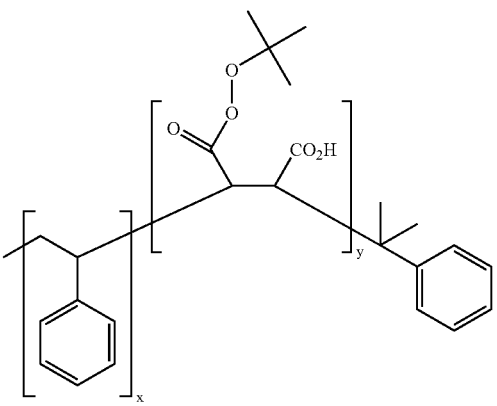

K

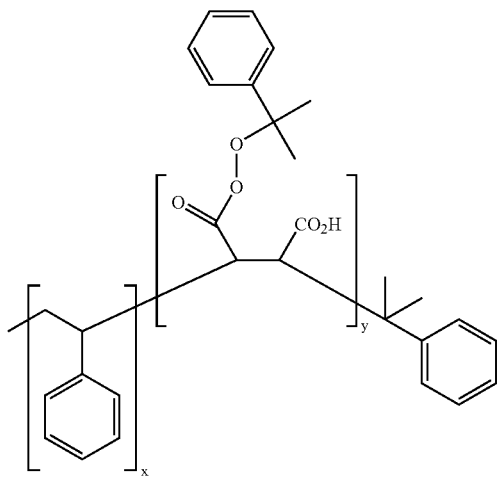

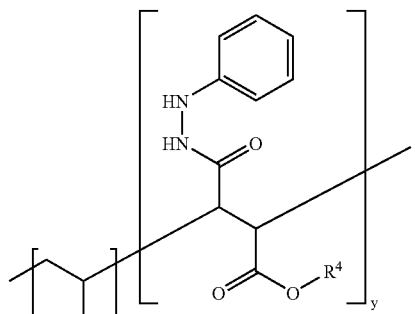

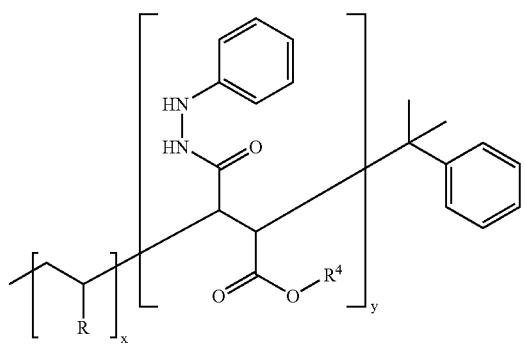

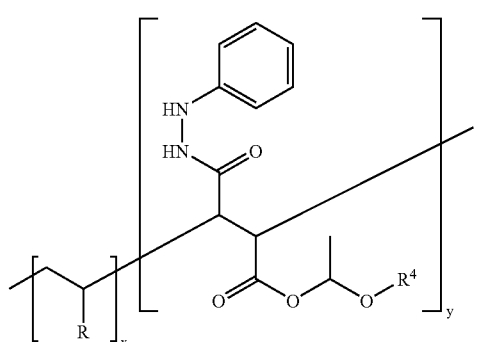

where in each of structures I, J, K and L, x is about 49 mole % and y is about 50 mole %.

The adduct so-formed when the anhydride opens upon reaction with the heteroatom-containing compound creates an available carboxylate pending from the copolymer backbone. In some cases, it may be desirable to react that so-formed caryboxylate with a vinyl ether or vinyl ester, particulary where a phenylhydrazide-based adduct has formed, to create an adduct with improved solubility in a (meth)acrylate component of an anaerobically curable composition. The vinyl ether or vinyl ester may be itself functionalized with one or more (meth)acrylate groups.

For instance, examples of the vinyl ether or vinyl ester that may be reacted with the so-formed carboxylate include:

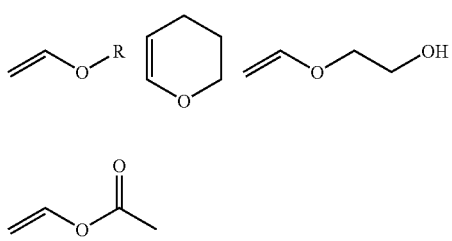

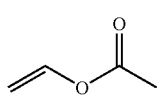

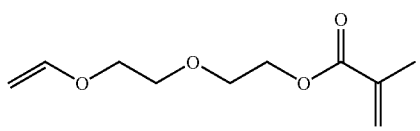

A particularly desirable example is 2-(2¹-vinyloxy ethoxy) ethyl methacrylate ("FX-VEEM")(CAS No. 76392-22-8), which is the last of the five chemicals shown above.

Examples of adducts whose carboxylate has been reacted with vinyl ethers and vinyl esters are shown below as structures L, M, N, O and P, in each case 1-12 (except N where a structure N is shown):

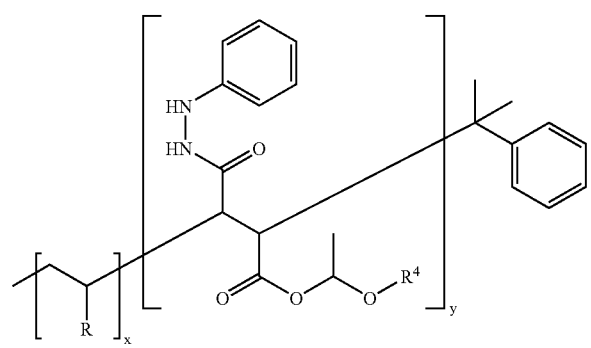

L5
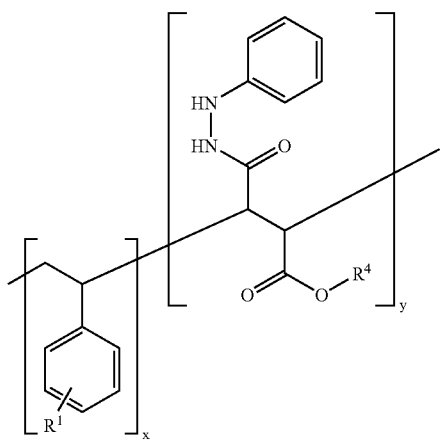
L8
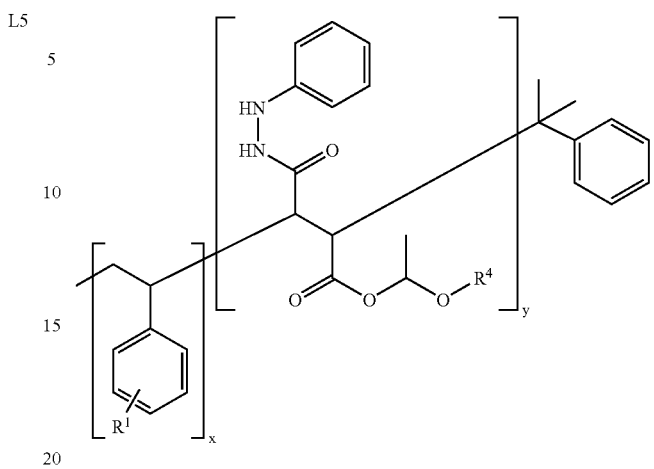
L6
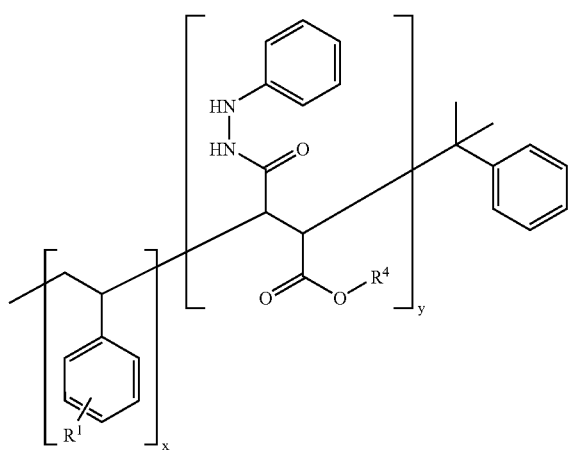
L9
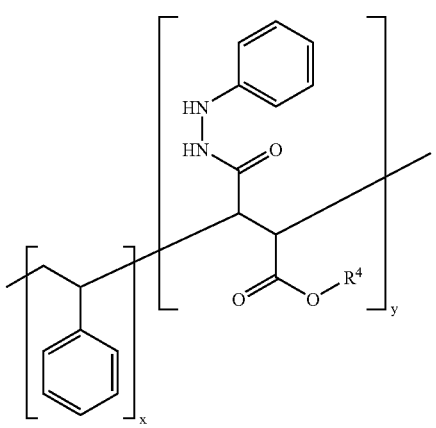
L7
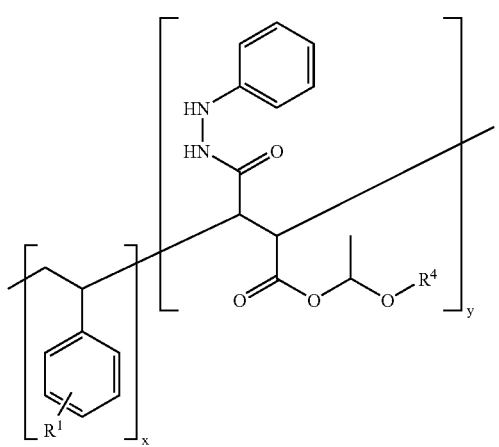
L10
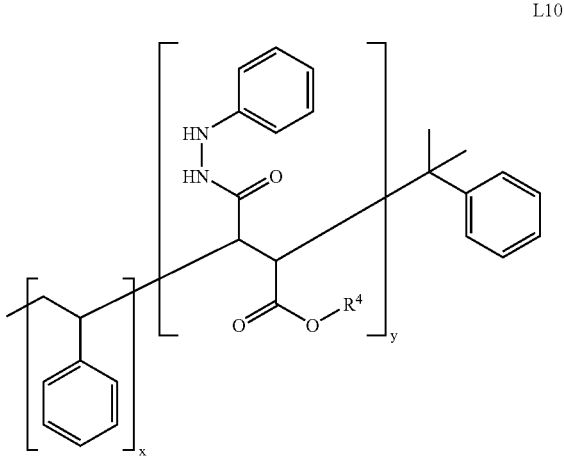

L11
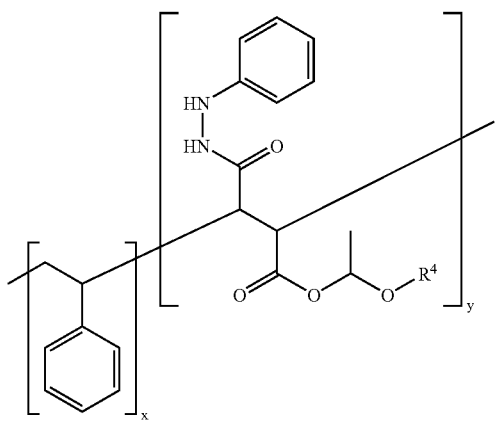
L12
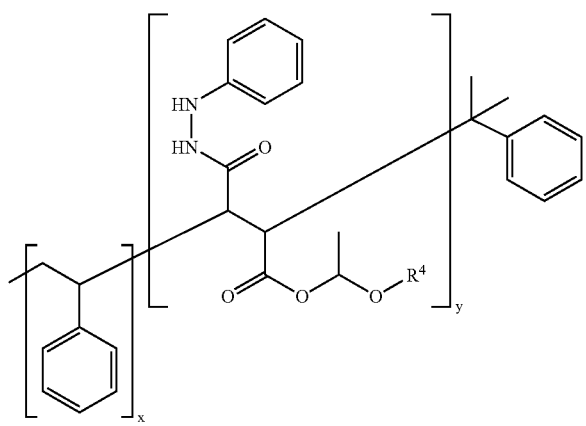
M1
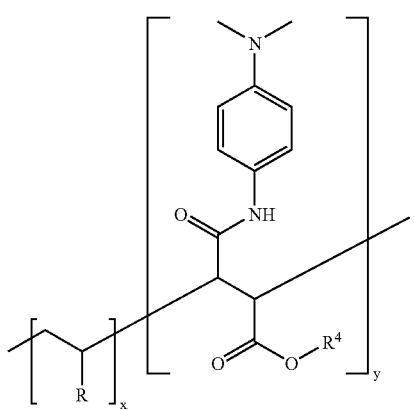
M2
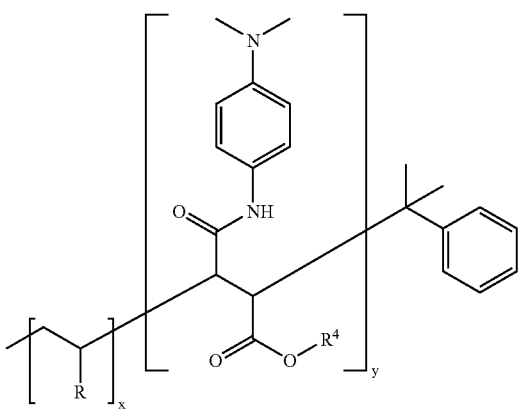
M3
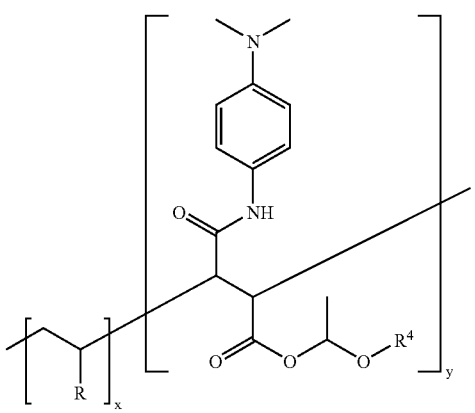
M4
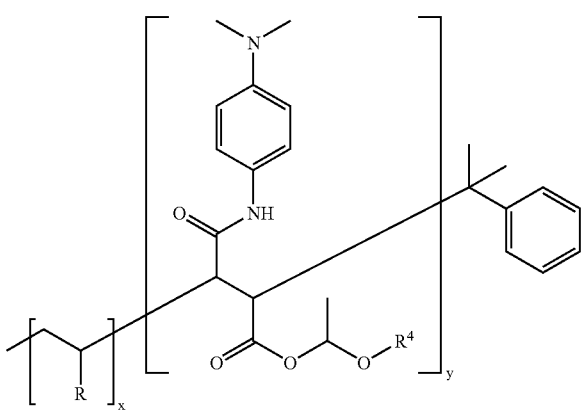

M5
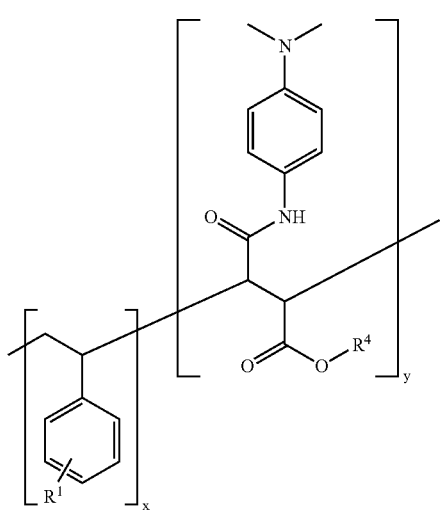
M6
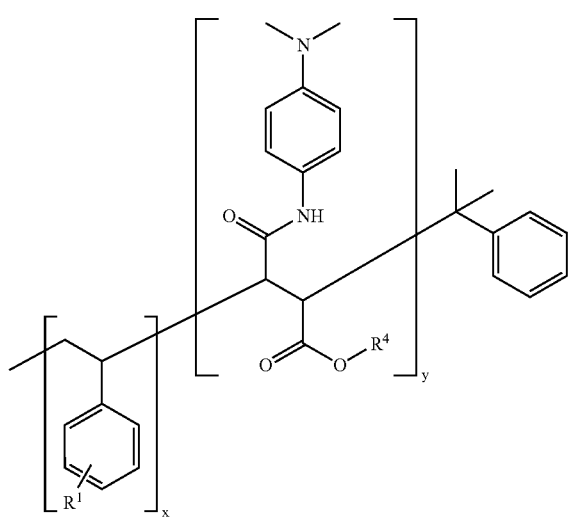
M7
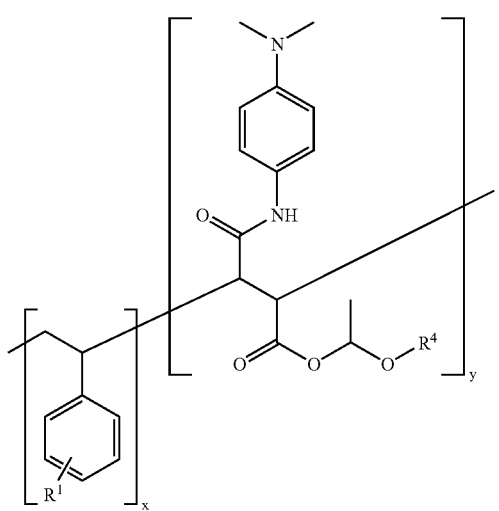
M8
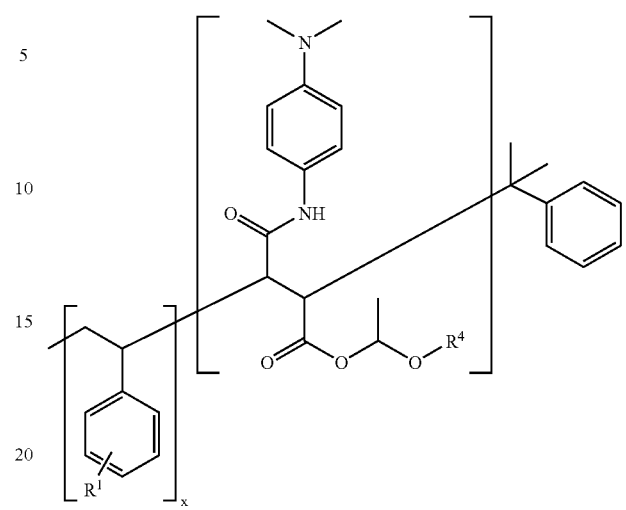
M9
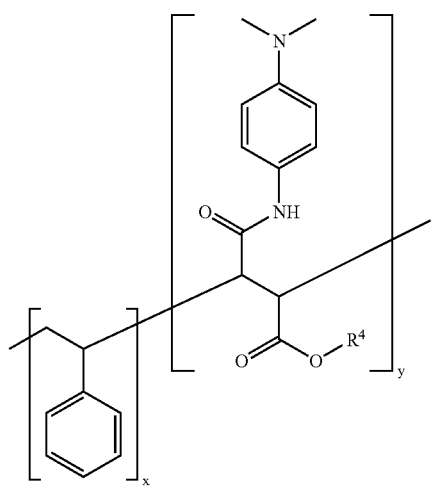
M10
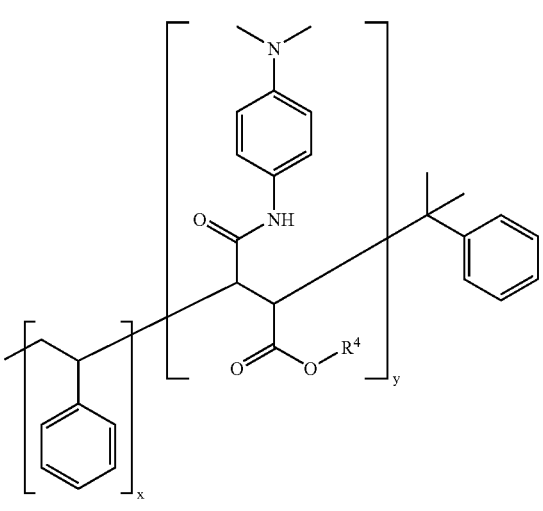

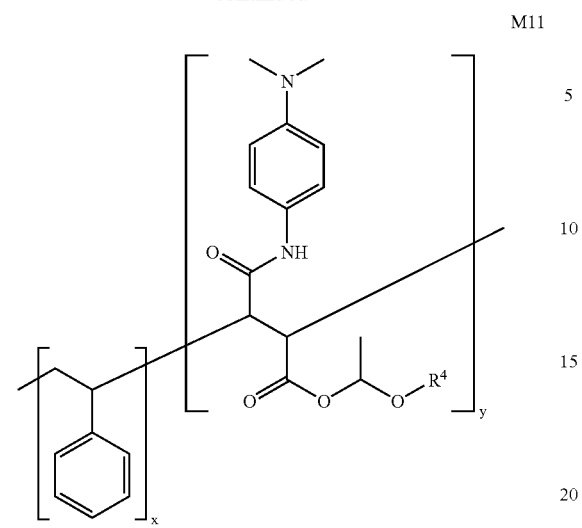
M11
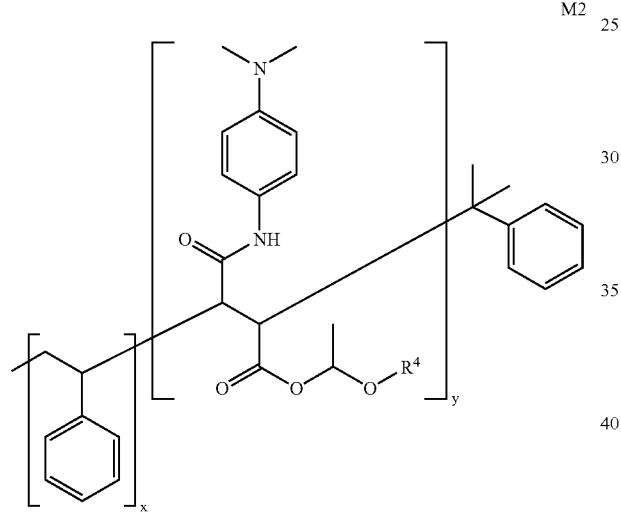
M2
For instance, structure N below may be reacted with ethylene glycol vinyl ether or vinyl acetate to yield structure N4. Other structural derivatives of structure N are shown below.
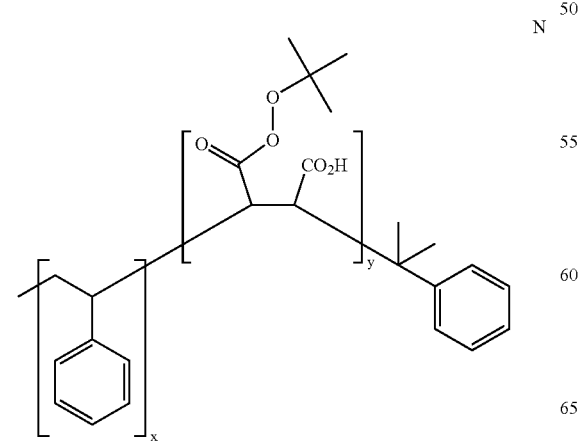
N
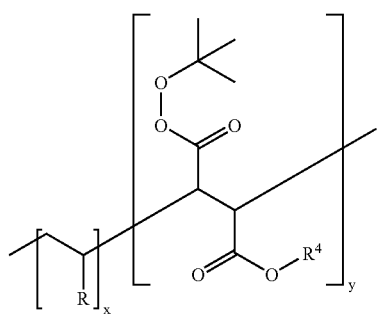
N1
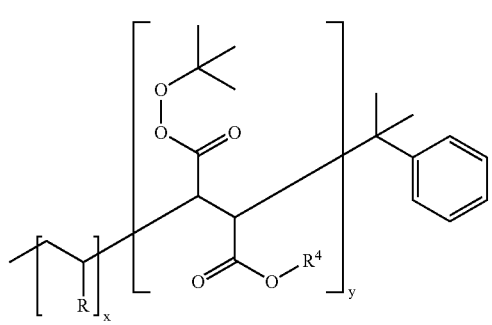
N2
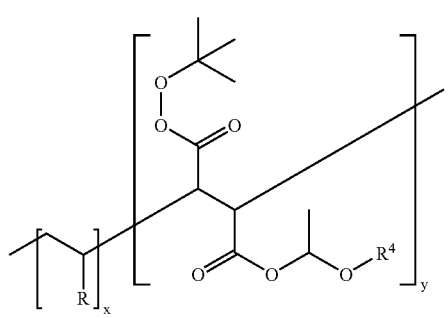
N3
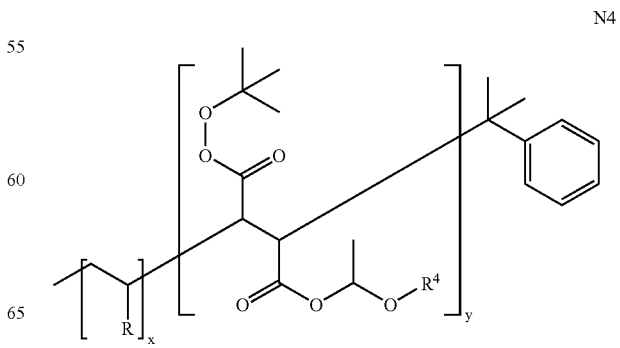
N4

N5
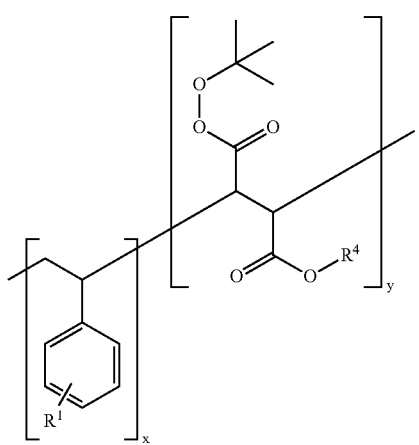
N8
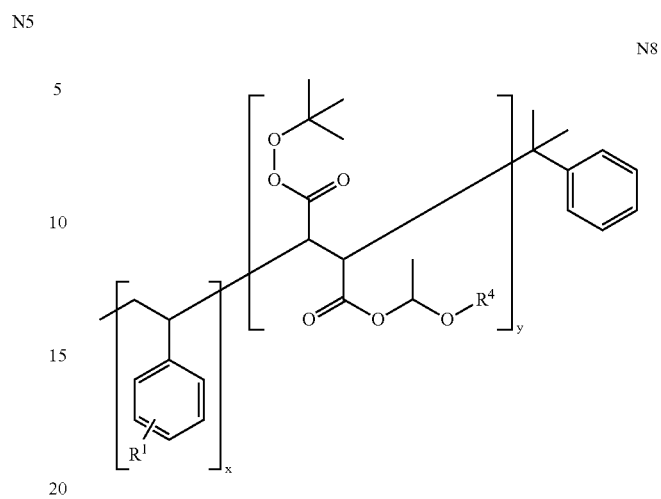
N6
N9
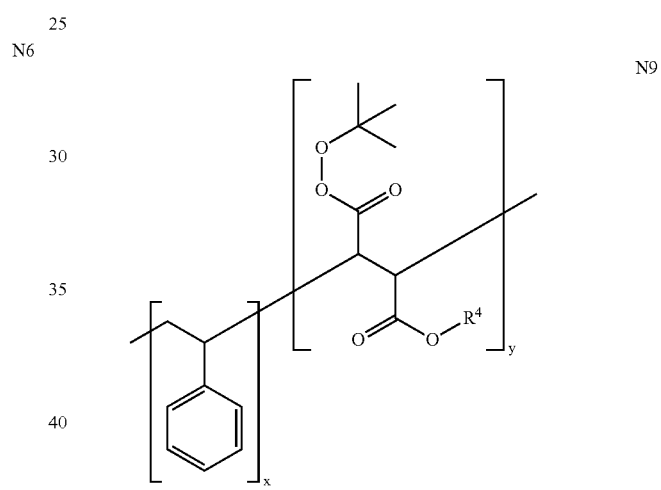
N7
N10
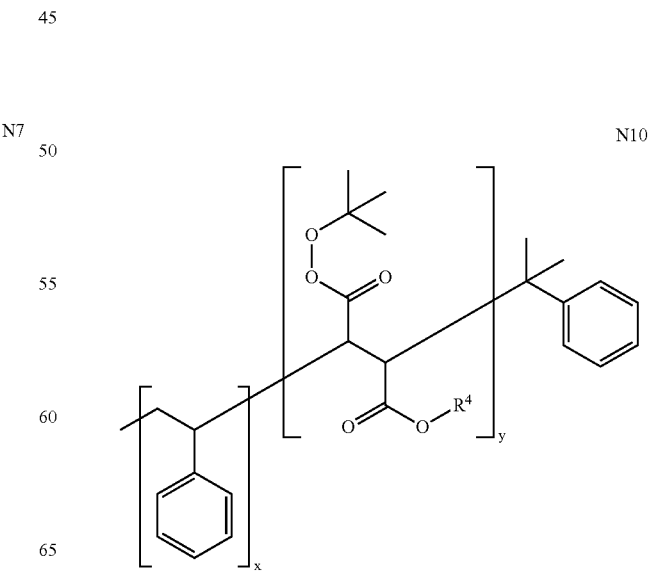

25
-continued
N11
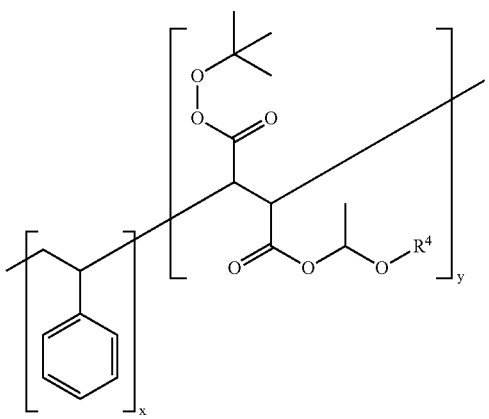
N12
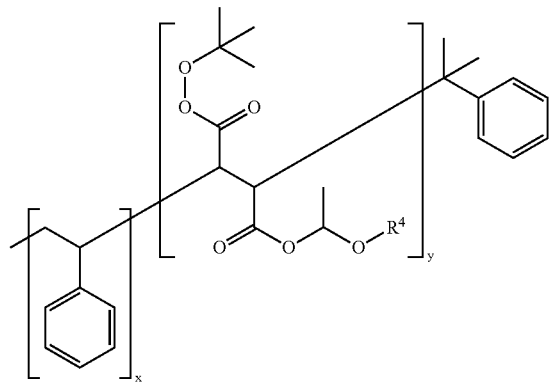
O1
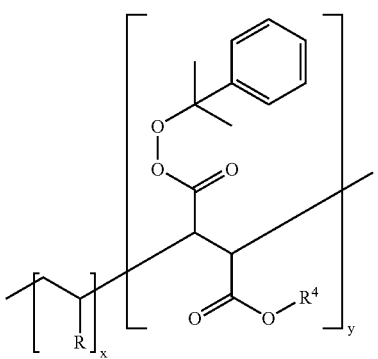
O2
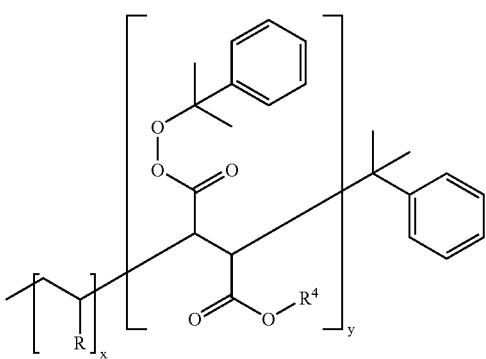
26
-continued
O3
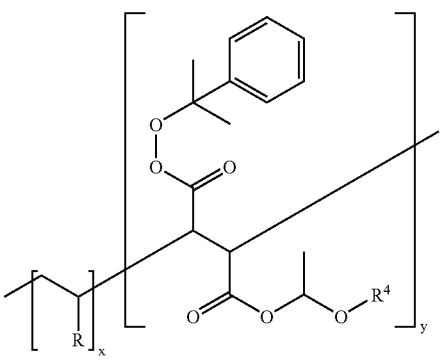
O4
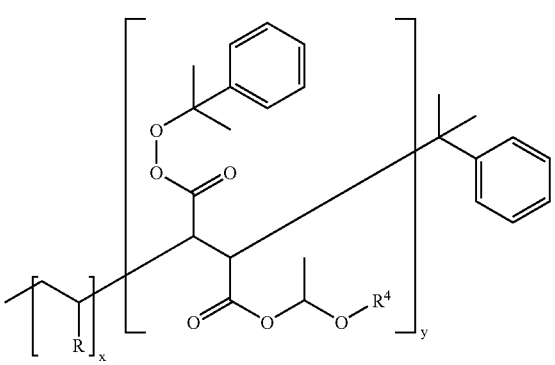
O5
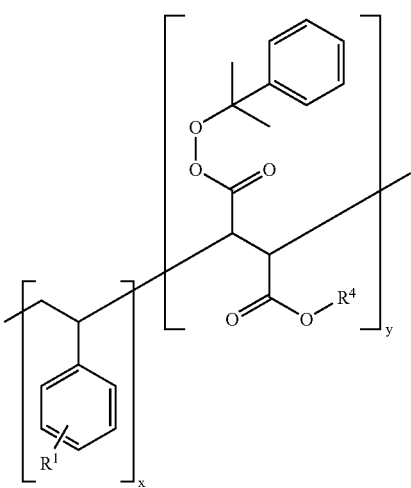

O6
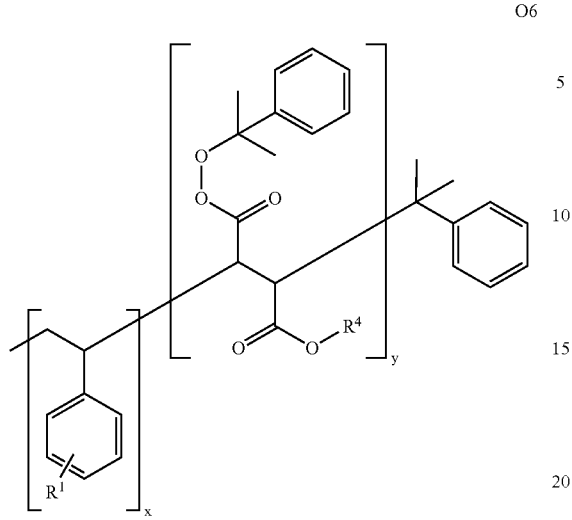
O7
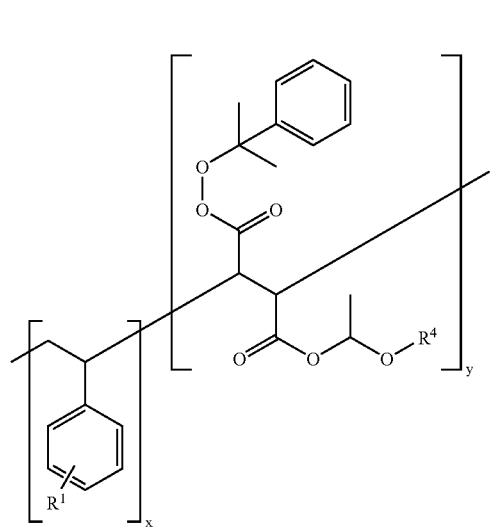
O8
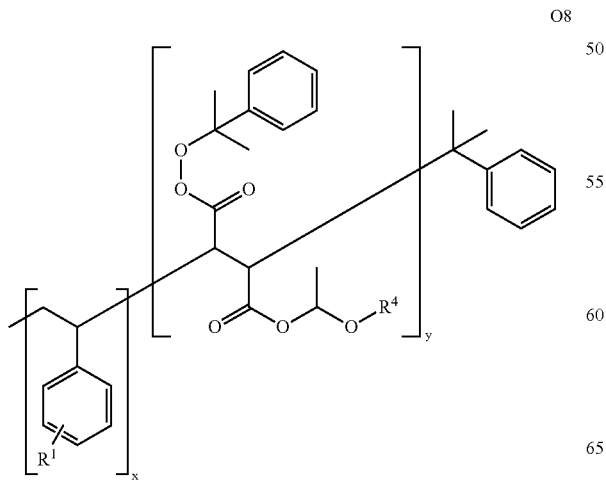
O9
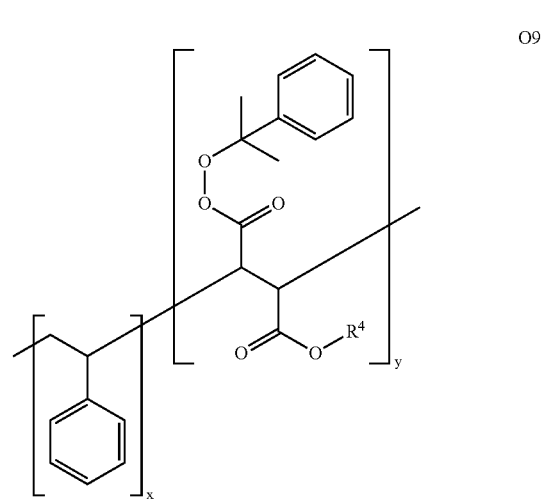
O10
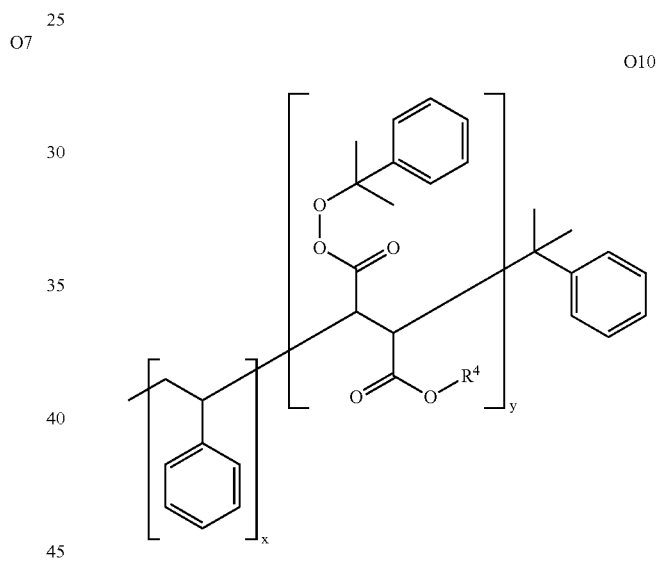
O11
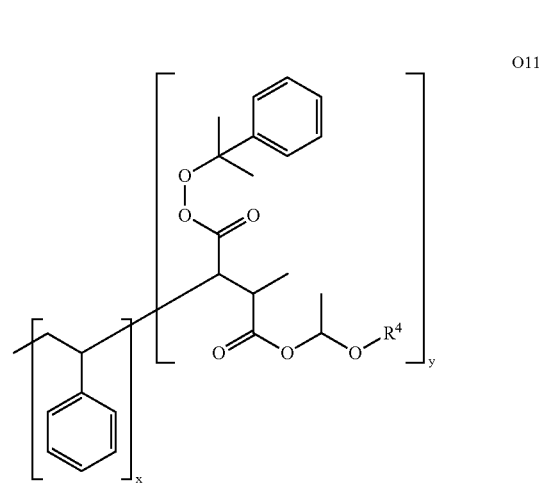

-continued
O12
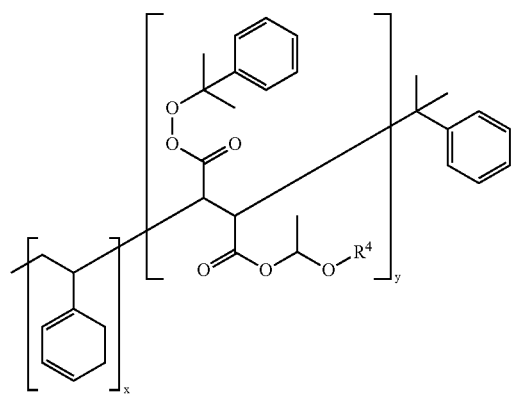
P1
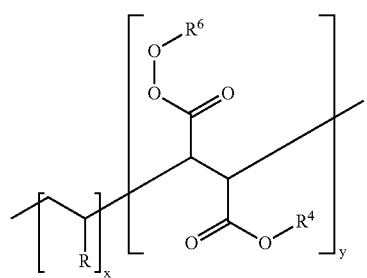
P2
P3
P4
P5
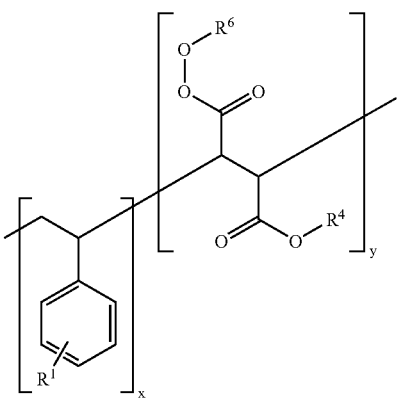
P6
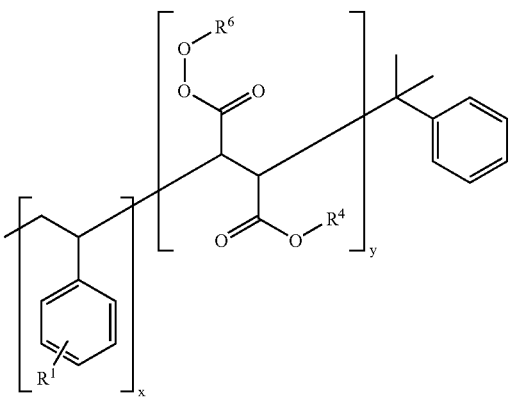
P7
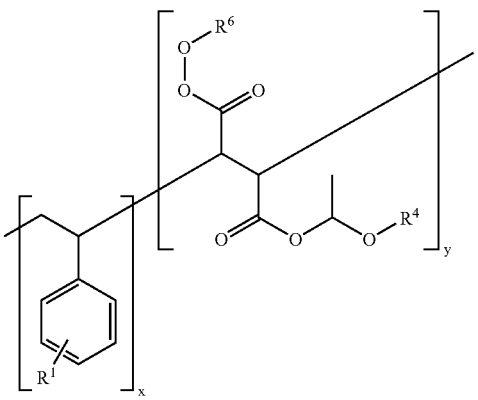
P8
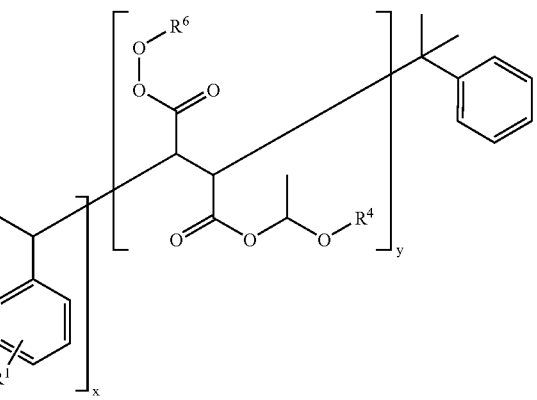

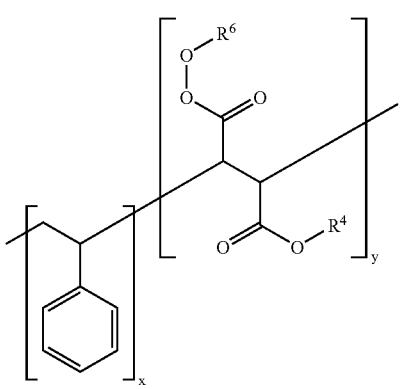

P9

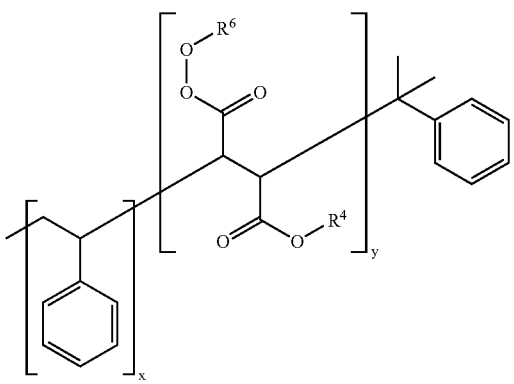

P10

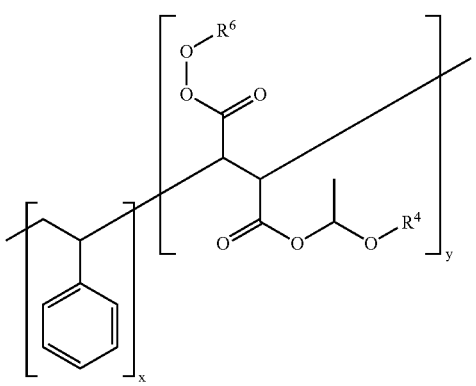

P11

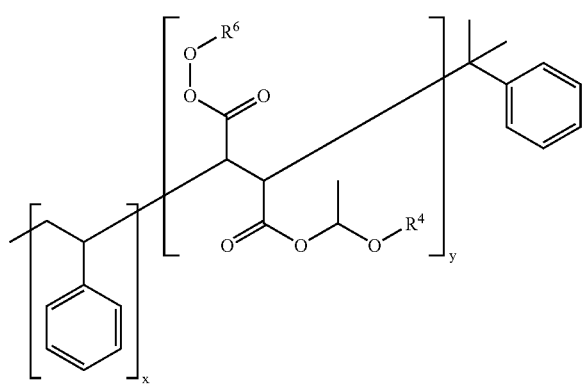

P12 where in each of structures L, M, N, O and P, R, x and y are as defined above, $R^6$ may be a linear, branched or cycloaliphatic alkyl or alkenyl, or aryl, and $R^4$ may be an adduct of a vinyl ether, such as

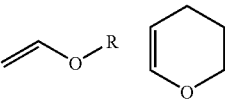

The carboxylate, such as shown in structure N, may also be converted into a salt, such as a Na, Ca, K, Cu, amine, and the like. In such case, the solubility of the adduct may be modified to render it more or less soluble depending on the matrix in which it is added. That ability may be realized and adopted by persons of skill in the art.

(Meth)acrylate monomers suitable for use as the (meth)acrylate component in the present invention may be chosen from a wide variety of materials, such as those represented by $H_2C=CGCO_2R^3$, where G may be hydrogen, halogen or alkyl groups having from 1 to about 4 carbon atoms, and $R^3$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, sulfone and the like.

Mono-functional (meth)acrylates like hydroxyethyl (meth)acrylate ("HEMA"), hydroxypropyl (meth)acrylate ("HPMA"), isobornylacrylate ("IBOA"), and the like may be suitable for use herein, particularly in combination with a di- or tri-functional (meth)acrylate, as set forth below.

Additional (meth)acrylate monomers suitable for use herein include polyfunctional (meth)acrylate monomers, such as di-or tri-functional (meth)acrylates like polyethylene glycol di(meth)acrylates ("PEGMA"), tetrahydrofuran (meth)acrylates and di(meth)acrylates, hexanediol di(meth)acrylate, trimethylol propane tri(meth)acrylates ("TMPTMA"), diethylene glycol dimethacrylate, triethylene glycol dimethacrylates ("TRIEGMA") tetraethylene glycol di(meth)acrylates, dipropylene glycol di(meth)acrylates, di-(pentamethylene glycol) di(meth)acrylates, tetraethylene diglycol di(meth)acrylates, diglycerol tetra(meth)acrylates, tetramethylene di(meth)acrylates, ethylene di(meth)acrylates, neopentyl glycol di(meth)acrylates, and bisphenol-A mono and di(meth)acrylates, such as ethoxylated bisphenol-A (met) acrylate ("EBIPMA"), and bisphenol-F mono and di(meth)acrylates, such as ethoxylated bisphenol-A (meth)acrylate.

Still other (meth)acrylate monomers that may be used herein include silicone (meth)acrylate moieties ("SiMA"), such as those taught by and claimed in U.S. Pat. No. 5,605,999 (Chu), the disclosure of which is hereby expressly incorporated herein by reference.

Of course, combinations of these (meth)acrylate monomers may also be used.

The (meth)acrylate component should comprise from about 10 to about 90 percent by weight of the composition, such as about 60 to about 90 percent by weight, based on the total weight of the composition.

Recently, additional components have been included in traditional anaerobic adhesives to alter the physical properties of either the formulation or the reaction products thereof.

For instance, one or more of maleimide components, thermal resistance-conferring coreactants, diluent components reactive at elevated temperature conditions, mono- or poly-hydroxyalkanes, polymeric plasticizers and chelators (see U.S. Pat. No. 6,391,993, the disclosure of which is hereby expressly incorporated herein by reference) may be included to modify the physical property and/or cure profile of the formulation and/or the strength or temperature resistance of the cured adhesive.

When used, the maleimide, coreactant, reactive diluent, plasticizer, and/or mono- or poly-hydroxyalkanes, may be present in an amount within the range of about 1 percent to about 30 percent by weight, based on the total weight of the composition.

The inventive compositions may also include other conventional components, such as an anaerobic cure-inducing composition, which oftentimes include one or more free radical initiators and inhibitors of free radical generation, as well as metal catalysts.

A number of well-known initiators of free radical polymerization are typically incorporated into the inventive compositions including, without limitations hydroperoxides, such as cumene hydroperoxide ("CHP"), para-menthane hydroperoxide, t-butyl hydroperoxide ("TBH") and t-butyl perbenzoate. Other peroxides include benzoyl peroxide, dibenzoyl peroxide, 1,3-bis(t-butylperoxyisopropyl)benzene, diacetyl peroxide, butyl 4,4-bis(t-butylperoxy)valerate, p-chlorobenzoyl peroxide, cumene hydroperoxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and combinations thereof.

Such peroxide compounds are typically employed in the present invention in the range of from about 0.1 to about 10 percent by weight, based on the total weight of the composition, with about 1 to about 5 percent by weight being desirable.

Stabilizers and inhibitors (such as phenols including hydroquinone and quinones) may also be employed to control and prevent premature peroxide decomposition and polymerization of the composition of the present invention, as well as chelating agents [such as the tetrasodium salt of ethylenediamine tetraacetic acid ("EDTA")] to trap trace amounts of metal contaminants therefrom. When used, chelating agents may ordinarily be present in the compositions in an amount from about 0.001 percent by weight to about 0.1 percent by weight, based on the total weight of the composition.

Metal catalyst solutions or pre-mixes thereof are used in amounts of about 0.03 to about 0.1 percent by weight.

The inventive adducts useful as anaerobic cure accelerators may be used in amounts of about 0.1 to about 10 percent by weight, such as about 1 to about 5 percent by weight, based on the total weight of the composition.

Other additives such as thickeners, non-reactive plasticizers, fillers, toughening agents (such as elastomers and rubbers) and other well-known additives may be incorporated therein where the art-skilled believes it would be desirable to do so.

The present invention also provides methods of preparing and using the inventive anaerobic adhesive compositions, as well as reaction products of the compositions.

The compositions of the present invention may be prepared using conventional methods which are well known to those persons of skill in the art. For instance, the components of the inventive compositions may be mixed together in any convenient order consistent with the roles and functions the components are to perform in the compositions. Conventional mixing techniques using known apparatus may be employed.

The compositions of this invention may be applied to a variety of substrates to perform with the desired benefits and advantages described herein. For instance, appropriate substrates may be constructed from steel, brass, copper, aluminum, zinc, and other metals and alloys, ceramics and thermosets. The compositions of this invention demonstrate particularly good bond strength on steel, brass, copper and zinc. An appropriate primer for anaerobic curable compositions may be applied to a surface of the chosen substrate to enhance cure rate. Or, the inventive anaerobic cure accelerators may be applied to the surface of a substrate as a primer. See e.g. U.S. Pat. No. 5,581,473 (Ramos).

Figure 2:
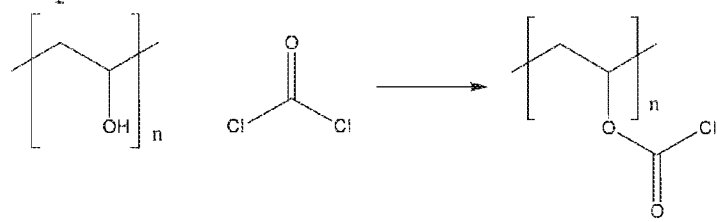
FIG. 2 depicts two routes of retrosynthetic schemes to form novel adducts generally useful as a cure component, in this case an accelerator.
Figure 2:
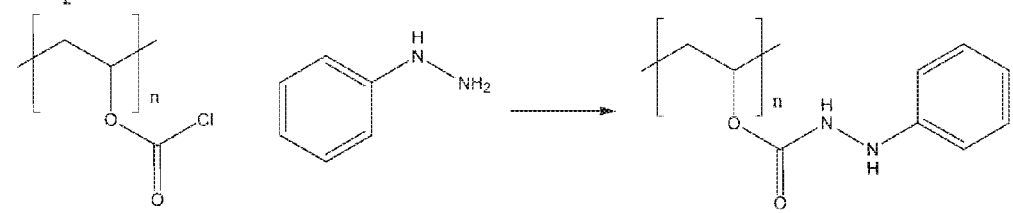
Figure 2:
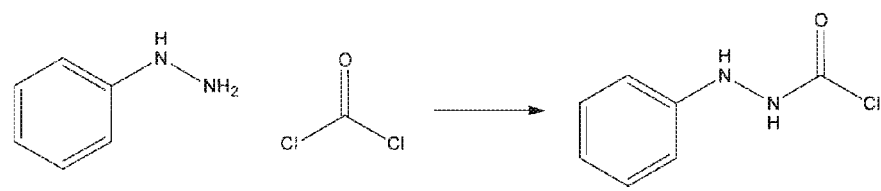
Figure 2:
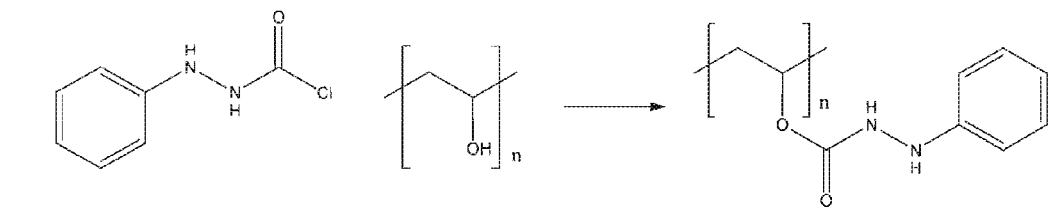

The invention also provides a method of forming the adduct. For instance, reference to FIG. 2 shows a retrosynthetic scheme to arrive at such adducts. In the formulation of the novel adducts the following derivatized polystyrene polymers may be useful precursors:

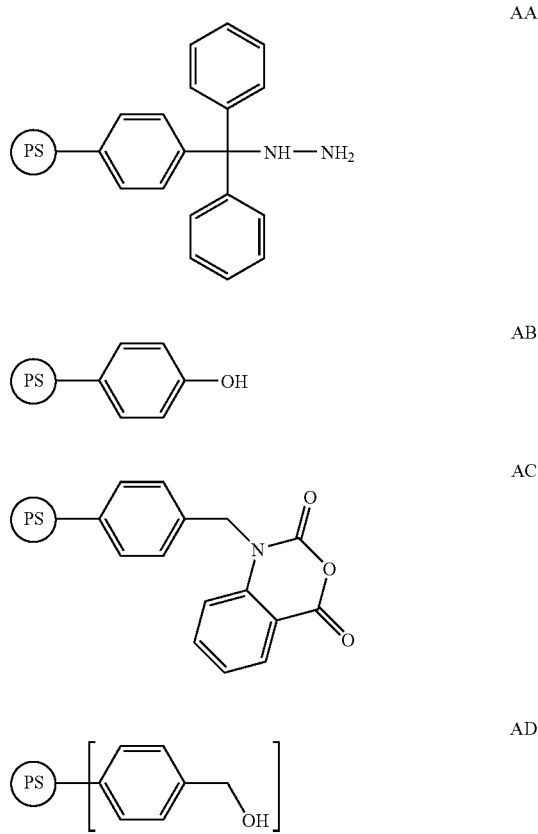

For instance, with reference to structure AA, an anhydride may be reacted therewith to form an adduct bound to a polystyrene backbone (represented by PS).

With reference to FIG. 2, structures AB and AD may be reacted with carbonyl dichloride to form an adduct bound to PS.

Polymeric alcohols, such as polyvinyl alcohol ("PVA") and polystyrene-co-allyl alcohol ("PScoAA"), may also be used as shown in FIG. 2. Below, PScoAA is shown as structure AE.

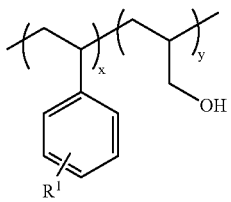

Polystyrene-co-allyl alcohol
(40% allyl alcohol)
avg M_W ~ 2200,
avg M_n ~ 1200, CAS 25119-62-4
mw 104.152 per x unit,
mw 58.0798 per y unit where $R^1$, x and y are as defined above.

Polymeric backbones with a halogenated substituents may also be used, such as poly(vinyl chloride)s ("PVC").

In addition, the following aromatic amines are useful accelerators that may react with the copolymer to form the novel adducts of the present invention.

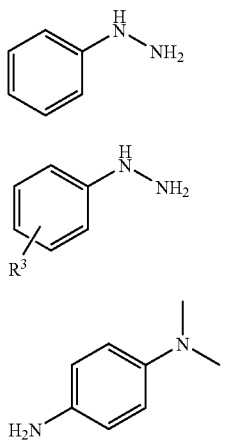

where $R^3$ may be the same as $R^2$, though selected from the same possibilities.

Or, a secondary amine, such as Piloty's acid (shown below), may react with the copolymer to form the novel adducts of the present invention.

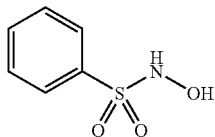 [SMILES: O=S(=O)(NO)c1ccccc1]

Structure AB, an anhydride, may react with any of the aromatic amines shown as structures BA-BC to form an adduct bound to PS.

The invention also provides a method of preparing an anaerobic curable composition, a step of which includes mixing together a (meth)acrylate component, and the inventive anaerobic curable composition.

The invention also provides a process for preparing a reaction product from the anaerobic curable composition of the present invention, the steps of which include applying the composition to a desired substrate surface and exposing the composition to an anaerobic environment for a time sufficient to cure the composition.

And the present invention provides a method of using the inventive anaerobic cure component, including (I) mixing the anaerobic cure component in an anaerobic curable composition or (II) applying onto a surface of a substrate the anaerobic cure component and applying thereover an anaerobic curable composition. Of course, the present invention also provides a bond formed between mated substrates with the inventive anaerobic cure component in an anaerobic curable composition.

In view of the above description of the present invention, it is clear that a wide range of practical opportunities is provided. The following examples are provided for illustrative purposes only, and are not to be construed so as to limit in any way the teaching herein.

EXAMPLES

An investigation was performed to evaluate certain polystyrene-co-maleic acid/heteroatom-containing adducts, as replacements for APH and/or CHP, for instance, in anaerobic curable compositions, particularly anaerobic curable adhesive compositions.

Some of the inventive anaerobic cure components were prepared in accordance with the synthetic scheme depicted in FIG. 1, and as described below. Infrared ("IR") spectral analyses were performed on neat samples using a Perkin Elmer FT-IR to confirm their structures.

Polystyrene-co-maleic acid/heteroatom-containing compound adducts were used in anaerobic curable compositions, which were compared with control formulations containing the conventional cure components, APH or CHP, by 82° C. accelerated ageing stability, fixture time, and one hour/24 hour adhesion tests on nut/bolt specimens.

A. General Procedure for the Synthesis of Adducts of Polystyrene-co-Maleic Acid ("PScoMA")/Toluidine Compounds The reaction was monitored by FT-IR as PScoMA/DM-p-T was formed.

To a 500 mL round bottom flask equipped with overhead mechanical stirring, thermo-probe with temperature control, heating mantle, pressure equilibrated addition funnel, nitrogen purge and water condenser, was added acetonitrile (75 mL). This was followed by the addition with stirring of poly(styrene-co-maleic anhydride) cumene terminated (50 mole styrene, avg. Mn ~1600) (50.0 g, 494.5 mmol), after which another portion of acetonitrile (25 mL) was added. The stirring mixture was held at a temperature of 50° C., and N,N-dimethyl-p-phenylene diamine (25.3 g, 180.0 mmol) in acetonitrile (150 mL) was added slowly over a period of time of 2 hours and the mixture stirred overnight at a temperature of 80° C.

The reaction mixture was allowed to cool to a temperature of 30° C. and then it was transferred to an addition funnel for dropwise addition into vigorously stirred water (3 L). After the addition was complete, a precipitated mixture was observed to have formed, which was stirred for 15 minutes and then allowed to stand unmixed for 15 minutes. The precipitate was allowed to settle and the liquid portion was decanted through a glass-fritted funnel (medium frit). The solid precipitate was collected and dried in vacuo at a temperature of 30° C. and a pressure of ~100 mTorr. A fine violet powdery solid was obtained as poly(styrene-co-maleic acid dimethyl-p-toluidine), 50 mol % polystyrene, (PS50coMA-DMpT), in a yield of less than 90%. The solid was analyzed and its structure confirmed by FT-IR, $^1$H and $^{13}$C NMR.

By this procedure, in addition to adducts of PScoMA/DM-p-T compounds, adducts of PScoMA/N-containing compounds, such as PScoMA/DE-p-T adduct, PScoMA/DE-o-T adduct, and PScoMA/DM-o-T adduct may be formed.

B. General Procedure for the Synthesis of Adducts of PScoMA/Phenyl Hydrazide Compounds A copolymer of polystyrene and maleic acid/phenylhydrazide ("PScoMAPH") was derived in one step from PScoMA, as described below.

To a 5 L round bottom flask equipped with overhead mechanical stirring, thermo-probe with temperature control, heating mantle, pressure equilibrated addition funnel, nitrogen purge and water condenser, was added acetonitrile (0.75 L). This was followed by the addition with stirring of poly (styrene-co-maleic anhydride) cumene terminated (50 mol % styrene, avg. Mn ~1600) (500.0 g, 4.95 mol), after which another portion of acetonitrile (0.5 L) was added. The stirring mixture was maintained at a temperature of 50° C., and phenylhydrazine (294.1 g, 2.64 mol) in acetonitrile (1.0 L) was added slowly over a period of time of 2 hours and the mixture stirred overnight at a temperature of 50° C.

The reaction mixture was allowed to cool to a temperature of 30° C. and then it was transferred to an addition funnel for dropwise addition into vigorously stirred water (3 L). After the addition was complete, a precipitated mixture was observed to have formed, which was stirred for another 15 minutes and then allowed to stand unmixed for 15 minutes. The precipitate was allowed to settle and the liquid portion was decanted through a glass-fritted funnel (medium frit). The solid precipitate was collected and dried in vacuo at a temperature of 30° C. and a pressure of ~100 mTorr. A fine yellow powdery solid was obtained as poly(styrene-co-maleic acid phenylhydrazide), 50 mol % polystyrene, (PS50coMAPH), in a yield of less than 90%. The yellow solid was analyzed and its structure confirmed by FT-IR, $^1$H and $^{13}$C NMR.

C. General Procedure for the Synthesis of Adducts of PScoMA/t-Butyl Hydroperoxide Compounds A copolymer of polystyrene and maleic acid/t-butyl hydroperoxides ("PScoMAt-BuO$_2$") was derived in one step from PScoMA, as described below.

To a 250 mL round bottom flask equipped with overhead mechanical stirring, thermo-probe with temperature control, heating mantle, pressure equilibrated addition funnel, nitrogen purge and water condenser, was added acetonitrile (40 mL). This was followed by the addition with stirring of poly (styrene-co-maleic anhydride) cumene terminated (50 mol % styrene, avg. Mn ~1600) (50.0 g, 494.5 mmol), after which another portion of acetonitrile (10 mL) was added. The stirring mixture was maintained at a temperature of 40° C., and dimethylaminopyradine (DMAP) (2.96 g, 23.98 mmol) was added. A solution of t-butyl hydroperoxide in water (70%) (30.87 g, 239.8 mmol) was added over a period of time of 20 minutes and the mixture was allowed to stir overnight (24 hours) at a temperature of 40° C. After this period of time, the reaction progress was checked/monitored by FT-IR. Additional portions of t-butyl hydroperoxide were added as needed to further the reaction. The reaction mixture was then added drop-wise directly to vigorously stirred water (500 mL). After the addition was complete, a precipitate was observed to have formed. The precipitate was allowed to settle and the upper liquid portion was decanted to a glass-fritted funnel (medium frit), where the liquid was passed through and the solid was collected. The solid precipitate was filtered until near dryness before it was collected and dried in vacuo at a temperature of 30° C. and a pressure of ~100 mTorr. A fine white powdery solid was obtained as poly (styrene-co-maleic acid t-butyl perester), 50 mol % polystyrene, (PS50coMA-tBuO$_2$), in a yield of less than 70%. The solid was analyzed by FT-IR, $^1$H and $^{13}$C NMR, and through comparison of the t-butyl protons and phenyl protons suggests a polymer that is 24% functional in t-butyl perester.

D. General Procedure for the Synthesis of Adducts of PScoMA/PH/AA Compounds

To a 250 mL round bottom flask equipped with overhead mechanical stirring, thermo-probe with temperature control, heating mantle, pressure equilibrated addition funnel, nitrogen purge and water condenser, was added acetonitrile (100 mL). This was followed by the addition with stirring of poly (styrene-co-maleic anhydride) cumene terminated (50 mol % styrene, avg. Mn ~1600) (50.0 g, 494.53 mmol), after which another portion of acetonitrile (50 mL) was added. The mixture was maintained at a temperature of 30° C.

To the stirring mixture was added a mixture of phenylhydrazine (28.1 g, 251.8 mmol) in acetonitrile (100 mL) over a period of time of 2 hours. Upon complete addition, the mixture was stirred at a temperature of 30° C. overnight (24 hours).

After this period of time, the reaction progress was checked/monitored by FT-IR and as necessary $^1$H NMR.

Once the first reaction was confirmed to be complete, the second reactant, vinyl acetate (21.9 g, 251.8 mmol), was added over a period of time of 15 minutes and the mixture was allowed to stir at a temperature of 30° C. overnight (24 hours).

After this second period of time, the reaction progress was again checked/monitored by FT-IR and as necessary by $^1$H NMR. Once the second reaction was confirmed to be complete, the mixture was transferred to an addition funnel, where it was added to stirring water (1 L). After complete addition, a precipitate was observed to have formed. The precipitate was allowed to settle, and the upper liquid portion was decanted to a glass-fritted funnel (medium frit), where the liquid was passed through and the solid was collected. The solid precipitate was filtered until near dryness before it was collected and dried in vacuo at a temperature of 30° C. and a pressure of ~100 mTorr. A fine yellow powdery solid was obtained as poly(styrene-co-maleic acid phenylhydrazide acetal acetate), 50 mol % polystyrene, (PS50coMA/PH/AA), in a yield of less than 76%. The yellow solid was analyzed by FT-IR, $^1$H and $^{13}$C NMR.

E. General Procedure for the Synthesis of Adducts of PScoMA/PH/AE Compounds

To a 5 L round bottom flask equipped with overhead mechanical stirring, thermo-probe with temperature control, heating mantle, pressure equilibrated addition funnel, nitrogen purge and water condenser, was added acetonitrile (0.75 L) This was followed by the addition with stirring of poly (styrene-co-maleic anhydride) cumene terminated (50 mol % styrene, avg. Mn ~1600) (500.0 g, 4.95 mol), after which another portion of acetonitrile (0.5 L) was added. The mixture was maintained at a temperature of 30° C.

To the stirring mixture was added a mixture of phenylhydrazine (294.1 g, 2.64 mol) in acetonitrile (1.0 L) over a period of time of 2 hours. Upon complete addition, the reaction mixture was stirred at a temperature of 30° C. overnight.

After this period of time, the reaction progress was checked/monitored by FT-IR and as necessary $^1$NMR. Once this reaction was confirmed to be complete, ethylene glycol vinyl ether (228.9 g, 2.52 mol) was added with stirring over a period of time of 15 minutes. After a few hours the reaction mixture becomes more translucent yellow and clear. Stirring continues overnight (24 hours). After this second period of time, the reaction progress is again checked/monitored by FT-IR and as necessary by $^1$H NMR. Once the second reaction is confirmed complete, the clear pale yellow liquid is transferred to an addition funnel where it is added drop-wise/ streaming directly to vigorously stirred water (10 L), either in portions or in entirety. After complete addition the precipitated mixture is stirred for another 15 minutes and then allowed to stand unmixed for 15 minutes. The precipitate is allowed to settle both at the bottom and top. The pale upper liquid portion is carefully decanted to a glass-fritted funnel (medium frit) where the liquid is passed through first before the majority of solid is collected. The vacuum filtration can be sluggish and is improved by scraping the bottom of the funnel. The solid precipitate is filtered until near dryness before it is collected and dried in vacuo at 30° C. and ~100 mTorr until constant weight is achieved. A fine yellow powdery solid results, Poly(styrene-co-maleic acid phenylhydrazide acetal ethanol), 50 mol % polystyrene, (PS50coMAPH-AE), yield <90%. The yellow solid is analyzed by FT-IR, $^1$H and $^{13}$C NMR.

F. Anaerobic Adhesive Formulations with PScoMA/Toluidine Compounds

Sample Nos. 1-3 were prepared from the noted components in the listed amounts, by mixing with a mechanical stirrer in plastic (LDPE) bottles. Each sample contained saccharin and peroxide as part of the anaerobic cure-inducing composition; each sample also contained napthaquinone and the chelator, EDTA. Sample No. 1 contained DM-p-T; Sample No. 2 did not contain a toluidine or polymer-bound derivative thereof. Sample No. 3 contained the inventive polymer-bound accelerator. In this case, the inventive polymer-bound accelerator, PScoMA-DE-p-T, is not a direct homologue to the conventional accelerator it replaced in the formulation.

TABLE 1

| Components | | Sample No./ Amount (grams) | | |
|---|---|---|---|---|
| Type | Identity | 1 | 2 | 3 |
| (Meth)acrylate | PEGMA | 65 | 65 | 65 |
| Diluent | PEG200 Monooleate | 28.6 | 29.4 | 28.6 |
| Conventional Accelerator | Saccharin | 3.8 | 3.8 | 3.8 |
| Conventional Accelerator | Toluidine (DE-p-T) | 0.8 | 0 | 0 |
| Novel Accelerator | PScoMA-DM-p-T | 0 | 0 | 0.8 |
| Peroxide | CHP | 1.8 | 1.8 | 1.8 |

G. Anaerobic Adhesive Formulations with PScoMA/PH Compounds

Sample Nos. 4-7 were prepared from the noted components in the listed amounts, by mixing with a mechanical stirrer in plastic (LDPE) bottles. Each sample contained saccharin, maleic acid, and peroxide as part of the anaerobic cure-inducing composition; each sample also contained viscosity modifier package, napthaquinone and the chelator, EDTA. Sample No. 4 contained APH, as well. Sample No. 5 did not contain APH or the inventive polymer-bound accelerator, PScoMA/PH. Sample Nos. 6 and 7 contained PScoMA/PH with Sample No. 7 containing twice as much as Sample No. 6.

TABLE 2

| Components | | Sample No./ Amount (grams) | | | |
|---|---|---|---|---|---|
| Type | Identity | 4 | 5 | 6 | 7 |
| (Meth)acrylate | PEGMA | 58 | 58 | 58 | 58 |
| Diluent | Tetraethylene glycol di(2-ethyl hexoate) | 29.55 | 29.70 | 29.55 | 29.40 |
| Conventional Accelerator | Saccharin | 1 | 1 | 1 | 1 |
| Conventional Accelerator | Maleic acid | 0.3 | 0.3 | 0.3 | 0.3 |
| Conventional Accelerator | APH | 0.15 | 0 | 0 | 0 |
| Novel Accelerator | PScoMAPH | 0 | 0 | 0.15 | 0.30 |
| Peroxide | CHP | 1 | 1 | 1 | 1 |
| Viscosity Modifier | Silica/Polymer | 10 | 10 | 10 | 10 |

H. Anaerobic Adhesive Formulations with PScoMA/tBuO$_2$

Sample Nos. 8 and 9 were prepared from the noted components in the listed amounts, by mixing with a mechanical stirrer in plastic (LDPE) bottles. Each sample contained saccharin, maleic acid, and APH as part of the anaerobic cure-inducing composition; each sample also contained viscosity modifier package, napthaquinone and the chelator, EDTA. Sample No. 8 contained CHP as well. Sample No. 9 contained the inventive polymer-bound cure component, PScoMA-tBuO$_2$, instead of CHP.

TABLE 4

| Components | | Sample No./ Amount (grams) | |
|---|---|---|---|
| Type | Identity | 8 | 9 |
| (Meth)acrylate | PEGMA | 58 | 58 |
| Diluent | Tetraethylene glycol di(2-ethyl hexoate) | 29.55 | 28.70 |
| Conventional Accelerator | Saccharin | 1 | 1 |
| Conventional Accelerator | Maleic acid | 0.3 | 0.3 |
| Conventional Accelerator | APH | 0.15 | 0.15 |
| Peroxide | CHP | 1 | 0 |
| Novel Initiator | PScoMA-t-BuO$_2$ | 0 | 2 |
| Viscosity Modifier | Silica/Polymer | 10 | 10 |

I. Anaerobic Adhesive Formulations with PScoMA/PH/Acetal Compounds

Sample Nos. 10-12 were prepared from the noted components in the listed amounts, by mixing with a mechanical stirrer in plastic (LDPE) bottles. Each sample contained saccharin, maleic acid, and peroxide as part of the anaerobic cure-inducing composition; each sample also contained viscosity modifier package, napthaquinone and the chelator, EDTA. Sample No. 10 contained APH, as well. Sample No. 11 did not contain APH, but did contain an inventive polymer-bound accelerator, PScoMAPH-AA. Sample No. 6 also did not contain APH, but did contain an inventive polymer-bound accelerator, PScoMAPH-AE.

TABLE 5

| Components | | Sample No./ Amount (grams) | | |
|---|---|---|---|---|
| Type | Identity | 10 | 11 | 12 |
| (Meth)acrylate | PEGMA | 58 | 58 | 58 |
| Diluent | Tetraethylene glycol di(2-ethyl hexoate) | 29.55 | 29.40 | 29.40 |
| Conventional Accelerator | Saccharin | 1 | 1 | 1 |
| Conventional Accelerator | Maleic acid | 0.3 | 0.3 | 0.3 |
| Conventional Accelerator | APH | 0.15 | 0 | 0 |
| Novel Accelerator | PScoMAPH-AA | 0 | 0.3 | 0 |
| Novel Accelerator | PScoMAPH-AE | 0 | 0 | 0.3 |
| Peroxide | CHP | 1 | 1 | 1 |
| Viscosity Modifier | Silica/Polymer | 10 | 10 | 10 |

J. Physical Properties

Figure 3:
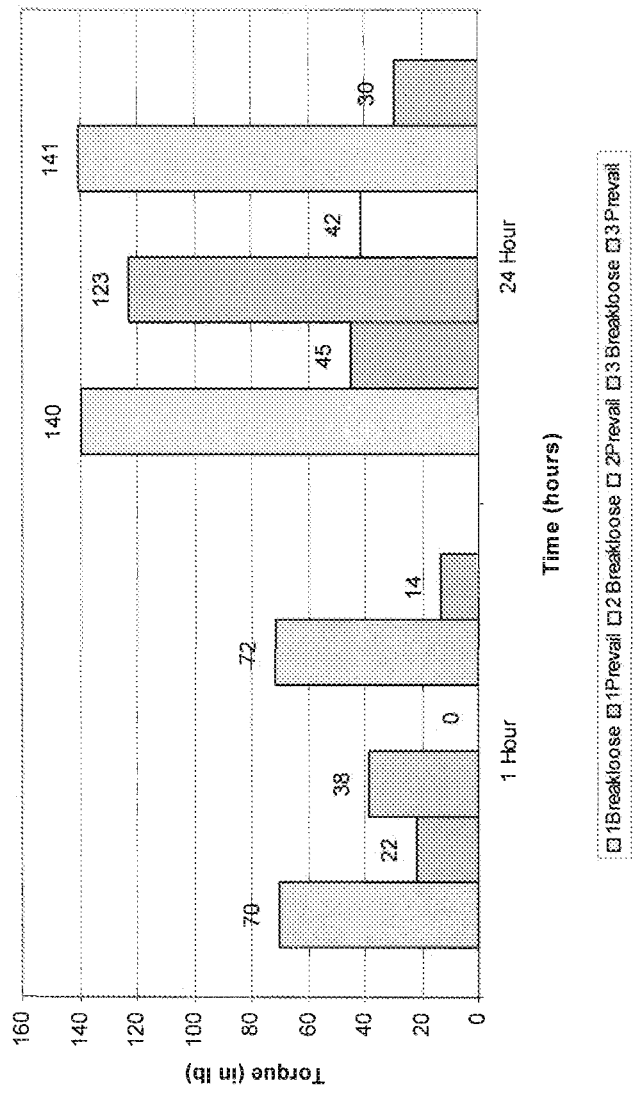
FIG. 3 depicts a bar chart of breakloose and prevail strengths on steel threaded fasteners of two control compositions and one within the scope of the present invention that uses a polymer-bound toluidine.

Referring back to Sample Nos. 13 in Table 1, Table 6 below reflects the results observed from break loose and prevail strength testing, after 1 hour cure at room temperature and 24 hour cure at room temperature. See also FIG. 3.

TABLE 6

| Physical Property (in lbs) | Sample No. | | |
|---|---|---|---|
| | 1 | 2 | 3 |
| Break Strength - 1 hour | 70 | 38 | 72 |
| Break Strength - 24 hour | 140 | 123 | 141 |
| Prevail Strength - 1 hour | 22 | 0 | 14 |
| Prevail Strength - 24 hour | 45 | 42 | 30 |

Figure 4:
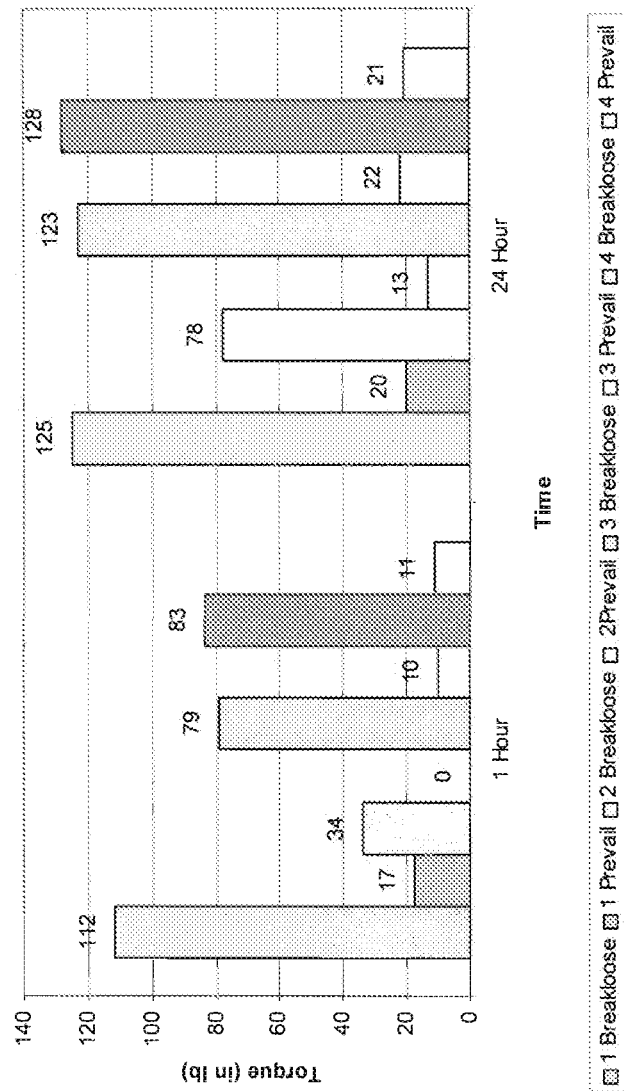
FIG. 4 depicts a bar chart of breakloose and prevail strengths on steel threaded fasteners of two control compositions and two within the scope of the present invention at different concentrations that uses a polymer-based phenyl hydrazine.

Referring back to Sample Nos. 4-7 in Table 2, Table 7 below reflects the results observed from break loose and prevail strength testing on steel threaded fasteners, after 1 hour cure at room temperature and 24 hour cure at room temperature. See also FIG. 4.

TABLE 7

| Physical Property (in lbs) | Sample No. | | | |
|---|---|---|---|---|
| | 4 | 5 | 6 | 7 |
| Break Strength - 1 hour | 112 | 34 | 79 | 83 |
| Break Strength - 24 hour | 125 | 78 | 123 | 128 |
| Prevail Strength - 1 hour | 17 | 0 | 10 | 11 |
| Prevail Strength - 24 hour | 20 | 13 | 22 | 21 |

Figure 5:
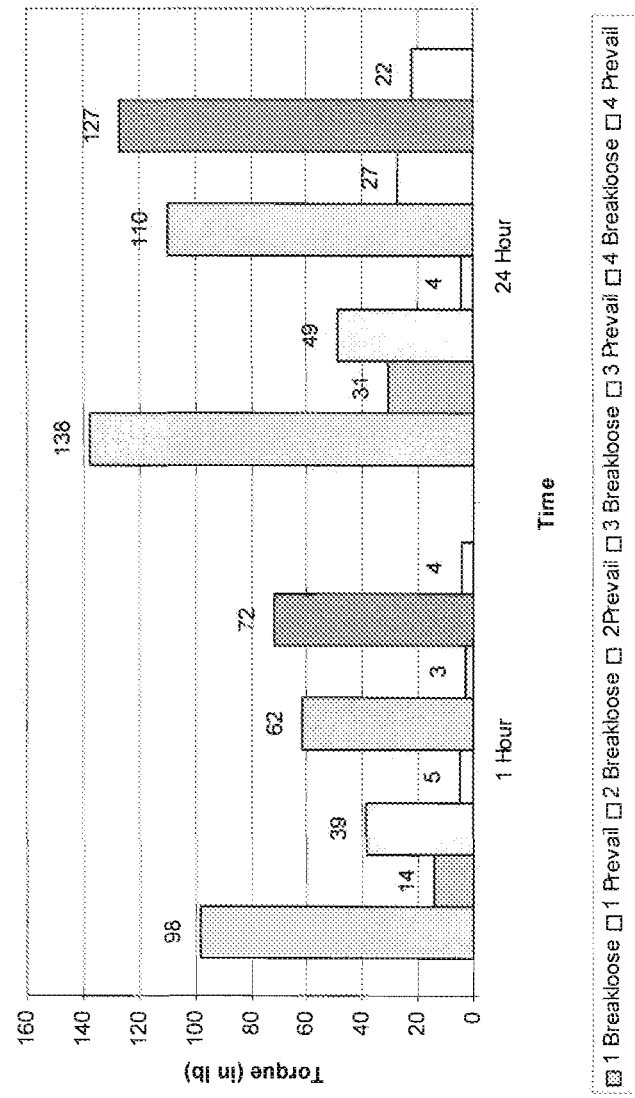
FIG. 5 depicts a bar chart of breakloose and prevail strengths on stainless steel threaded fasteners of a control composition and two within the scope of the present invention at different concentrations that uses a polymer-bound phenyl hydrazine.

And with respect Sample Nos. 4-7 applied to stainless steel threaded fasteners, see Table 8 below and FIG. 5.

TABLE 8

| Physical Property (in lbs) | Sample No. | | | |
|---|---|---|---|---|
| | 4 | 5 | 6 | 7 |
| Break Strength - 1 hour | 98 | 39 | 62 | 72 |
| Break Strength - 24 hour | 138 | 49 | 110 | 127 |
| Prevail Strength - 1 hour | 14 | 5 | 3 | 4 |
| Prevail Strength - 24 hour | 31 | 4 | 27 | 22 |

Figure 6:
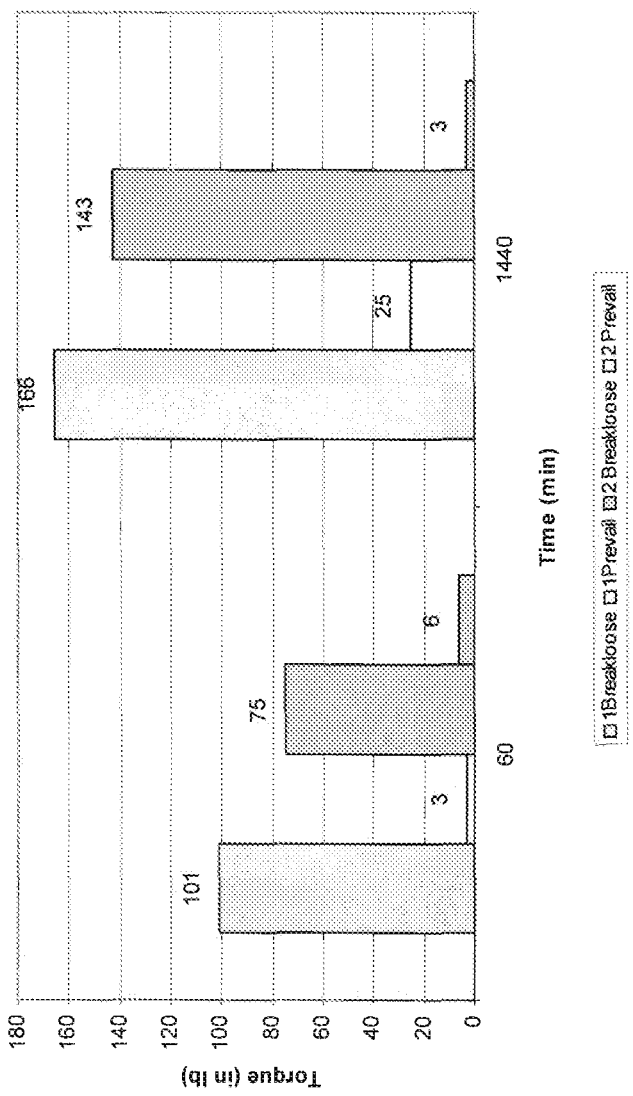
FIG. 6 depicts a bar chart of breakloose and prevail strengths on steel threaded fasteners of a control that was a polymer-bound peroxide composition and one within the scope of the present invention that uses a polymer-bound peroxide.

Referring back to Sample Nos. 8 and 9 in Table 4, Table 9 below reflects the results observed from break loose and prevail strength testing on steel threaded fasteners, after 1 hour cure at room temperature and 24 hour cure at room temperature. See also FIG. 6.

TABLE 9

| Physical Property (in lbs) | Sample No. | |
|---|---|---|
| | 8 | 9 |
| Break Strength - 1 hour | 101 | 75 |
| Break Strength - 24 hour | 166 | 143 |
| Prevail Strength - 1 hour | 3 | 6 |
| Prevail Strength - 24 hour | 25 | 3 |

Referring back to Sample Nos. 10-12 in Table 5, Table 10 below reflects the results observed from break loose and prevail strength testing on steel threaded fasteners, after 1 hour cure at room temperature and 24 hour cure at room temperature. See also FIG. 7.

TABLE 10

| Physical Property (in lbs) | Sample No. | | |
|---|---|---|---|
| | 10 | 11 | 12 |
| Break Strength - 1 hour | 143 | 129 | 112 |
| Break Strength - 24 hour | 178 | 173 | 157 |
| Prevail Strength - 1 hour | 17 | 4 | 3 |
| Prevail Strength - 24 hour | 24 | 17 | 16 |

These data indicate that the formulations using the polymer-bound cure components in accordance with this invention functioned at room temperature like traditional anaerobic (meth)acrylate-based adhesives when applied and cured on the substrates. More specifically, anaerobic adhesive compositions prepared with such polymer-bound cure components, show favorable stability and performance with active substrates such as steel.

What is claimed is:

1. An anaerobic curable composition, comprising:
   (a) a (meth)acrylate component;
   (b) an anaerobic cure-inducing composition; and
   (c) a polymer composition which is a reaction product of a heteroatom-containing compound selected from the group consisting of arylhydrazines, amines, amino-substitued toluidines, hydroxy-substituted toluidines, mercapto-substituted toluidines, peroxides, peresters and combinations thereof and copolymers of a latent carboxylic acid and a member selected from the group consisting of styrene and substituted derivatives thereof, vinyl ether, polyalkyene, (meth)acrylate ester and combinations thereof, which polymer composition is optionally terminated by a cumene residue, and wherein the polymer composition has a molecular weight of at least 1,000 dalton, but less than 15,000 dalton, wherein the polymer composition contains a linkage selected from the group consisting of —C(=O)—NH—NH—Ar, —C(=O)—NH—NH—R, —C(=O)—NH—NH—SO$_2$—Ar, —C(=O)—NH—NH—SO$_2$—R, —C(=O)—S—Ar—NR$^1$R$^2$, —C(=O)—NH—Ar—NR$^1$R$^2$, —C(=O)—O—Ar—NR$^1$R$^2$, —C(=O)—NH—SO$_2$—, —C(=O)—N(OH)—SO$_2$—, —C(=O)—O—SO$_2$—, and —C(=O)—S—SO$_2$—, wherein Ar is an aromatic group and R, R$^1$ and R$^2$ are each individually selected from the group consisting of H, alkyl having from 1 to about 8 carbon atoms, alkenyl having from 2 to about 8 carbon atoms and aryl having from 6 to about 16 carbon atoms.

2. The composition of claim 1, wherein the (meth)acrylate component is represented by $H_2C=CGCO_2R^4$, wherein G is a member selected from the group consisting of H, halogen and alkyl having from 1 to about 4 carbon atoms, and $R^4$ is a member selected from the group consisting of alkyl, cycloalkyl, aklenyl, cycloalkenyl, alkaryl, and aryl groups having from 6 to about 16 carbon atoms, with or without substitution or interruption by a member selected from the group consisting of silane, silicon, oxygen, halogen, carbonyl, hydroxyl, ester, carboxylic acid, urea, urethane, carbamate, amine, amide, sulfur, sulfonate and sulfone.

3. The composition of claim 1, wherein the (meth)acrylate component is a member selected from the group consisting of silicone (meth)acrylates, polyethylene glycol di(meth)acrylates, tetrahydrofuran (meth)acrylates and di(meth)acrylates, hydroxyethyl (meth) acrylate, hydroxypropyl (meth)acrylate, isobornyl acrylate, hexanediol di(meth)acrylate, trimethylol propane tri(meth)acrylates, diethylene glycol di(meth)acrylates, triethylene glycol di(meth)acrylates, tetraethylene diglycol di(meth)acrylates, diglycerol tetra(meth)acrylates, tetramethylene di(meth)acrylates, ethylene di(meth)acrylates, neopentyl glycol di(meth)acrylates, bisphenol-A-(meth)acrylates, ethoxylated bisphenol-A-(meth)acrylates, bisphenol-F-(meth)acrylates, ethoxylated bisphenol-F-(meth)acrylates, bisphenol-A di(meth)acrylates, ethoxylated bisphenol-A-di(meth)acrylates, bisphenol-F-di(meth)acrylates, and ethoxylated bisphenol-F-di(meth) acrylates.

4. The composition of claim 1, wherein the heteroatom-containing compound in the polymer composition is reactive with the latent carboxylic acid.

5. The composition of claim 1, wherein the polymer composition contains a linkage selected from the group consisting of —C(=O)—NH—NH—, —C(=O)—NH—, —C(=O)—O, —C(=O)—OH and —C(=O)—O—O—$R^3$, wherein $R^3$ is selected from H, alkyl having from 1 to about 8 carbon atoms, alkenyl having from 2 to about 8 carbon atoms and aryl having from 6 to about 16 carbon atoms.

6. The composition of claim 1, wherein the polymer composition is embraced by the nominal structure:

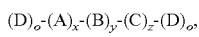

wherein A is a residue selected from the group consisting of styrene or substituted styrene, an acrylate ester, a vinyl ether and a polypropylene; B is a residue of an adduct formed from a latent carboxylic acid and a heteroatom-containing compound; C is an optional residue as defined by A, and D is a cumene residue; x+y+z=100% −(o+o'), and o and o'=0 or 1, representing the presence or absence of a cumene residue unit.

7. The composition of claim 1, wherein the polymer composition is terminated with a cumene residue.

8. The composition of claim 1, wherein the polymer composition is a member selected from the group consisting of

A

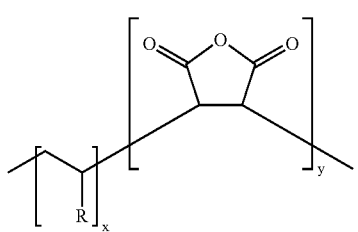

B

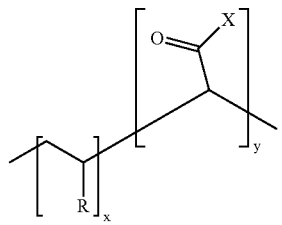

C

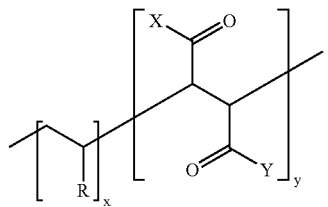

D

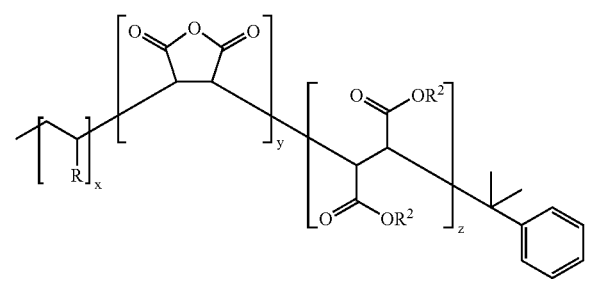

E

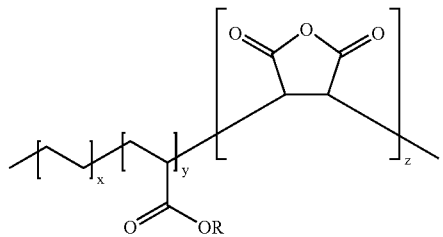

F

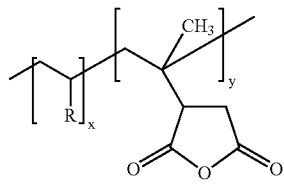

G

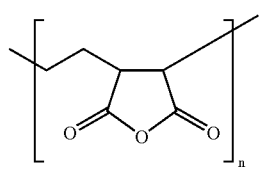

H

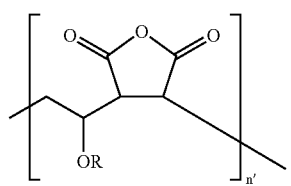

wherein R is selected from a group consisting of H, alkyl having from 1 to about 8 carbon atoms, alkenyl having from 2 to about 8 carbon atoms and aryl having from 6 to about 16 carbon atoms, x, y, z are each individually between 1 and 99 mole %, X and Y may be the same or different and are selected from the group consisting from halogen, hydroxyl and amine, $R^2$ is a member selected from the group consisting of H, alkyl, alkenyl, acetal and alkyl ether, n is an integer between 10 and 1,000, and $n^1$ is an integer between 10 and 2,000.

9. The composition of claim 1, wherein the polymer composition is a member selected from the group consisting of

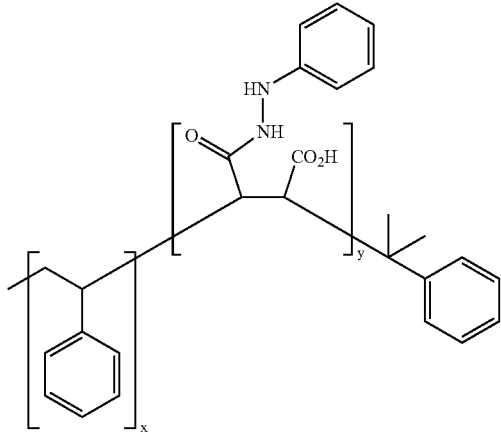

I

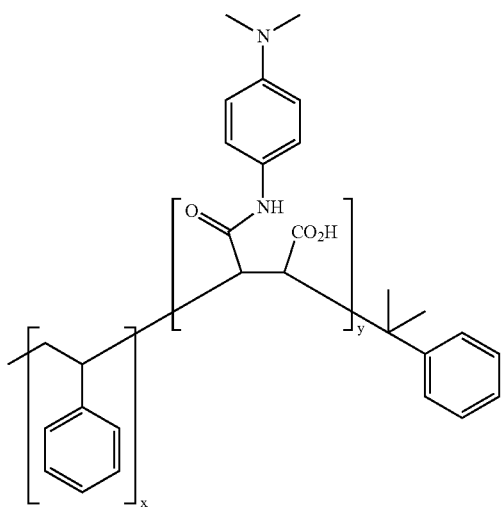

J

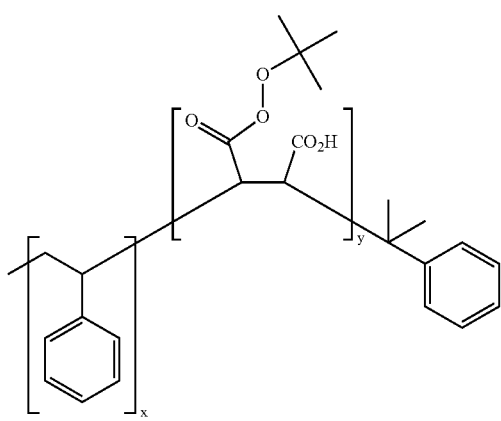

K

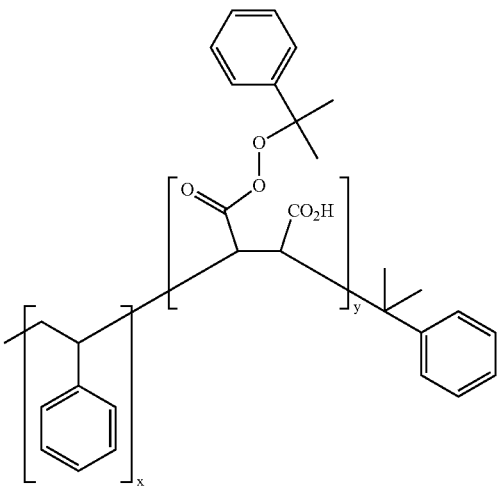

L wherein x is about 49 mole % and y is about 50 mole %.

10. The composition of claim 1, wherein the heteroatom-containing compound reactive with the latent carboxylic acid in the adduct accelerates the rate of anaerobic cure in the anaerobically curable compostion.

11. Reaction products of the composition of claim 1.

12. A process for preparing a reaction product from an anaerobic curable composition, comprising the steps of:
    apply an anaerobic curable composition of claim 1, to a desired substrate surface;
    mating the desired substrate surface with another substrate surface; and
    exposing the mated substrate surfaces with the composition therebetween to an anaerobic environment for a time sufficient to cure the composition.

13. A bond formed between two mated substrates with the composition of claim 1.

14. A polymer composition comprising one or more of:

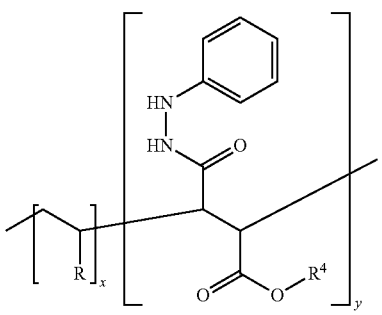

L1

L2
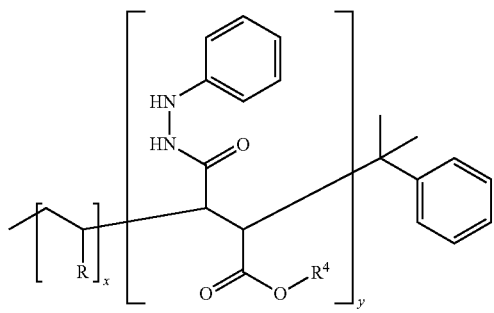
L3
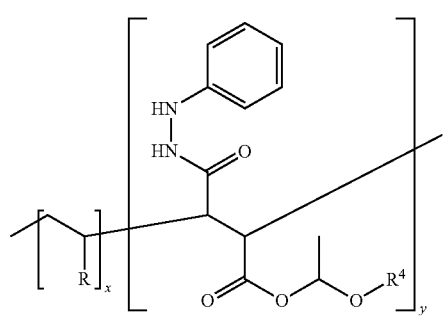
L4
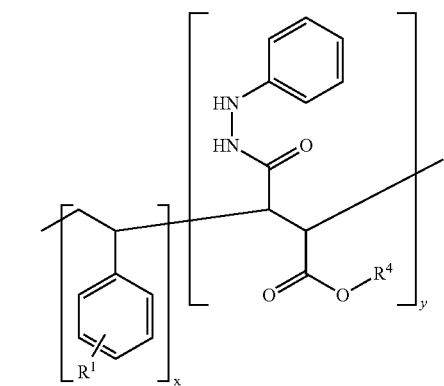
L5
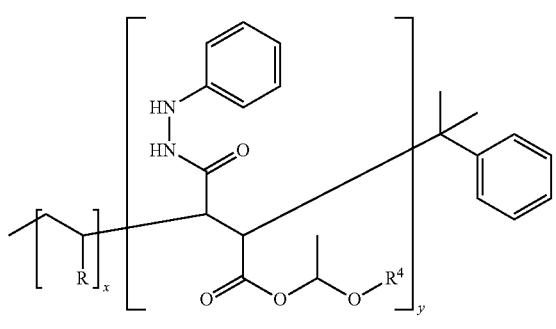
L6
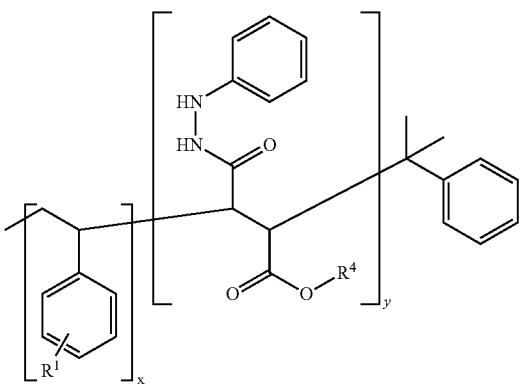
L7
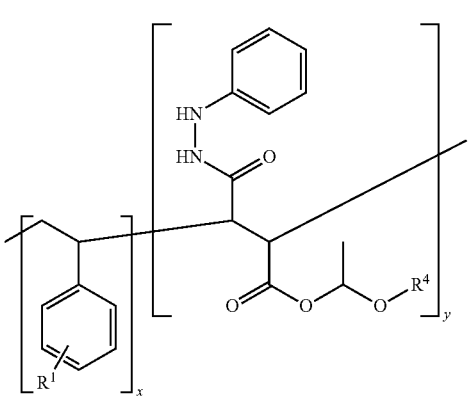
L8
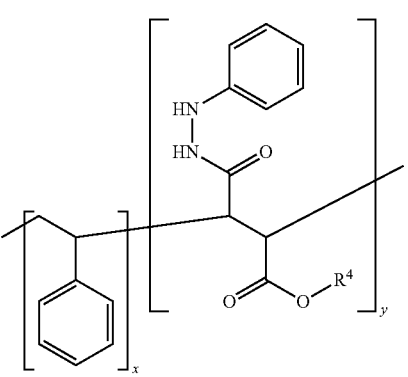
L9
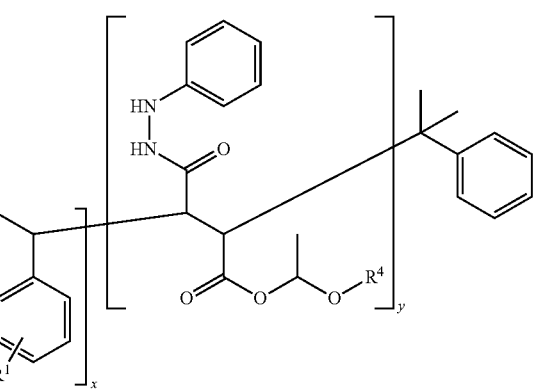

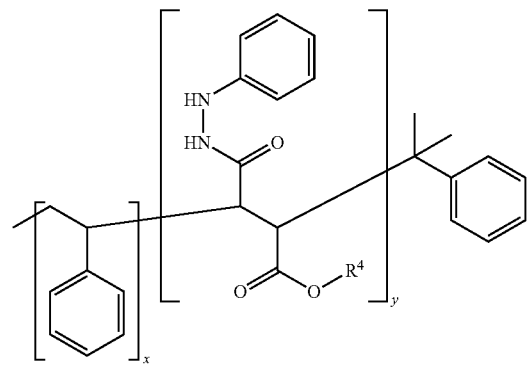

L10

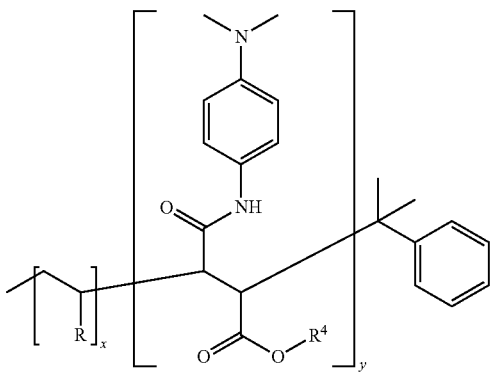

M2

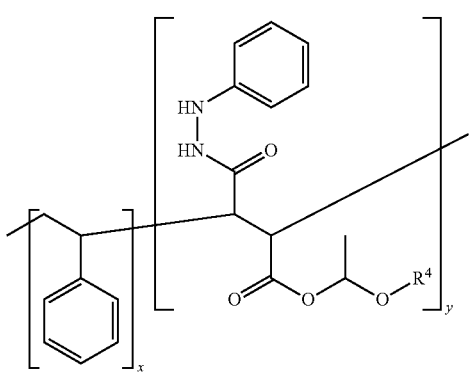

L11

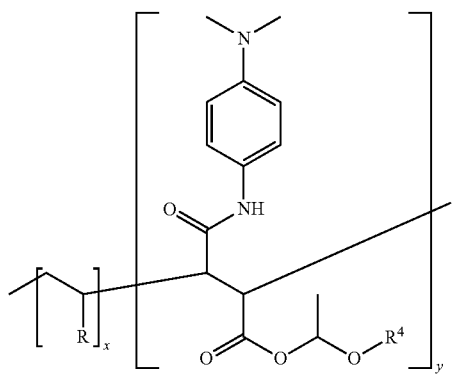

M3

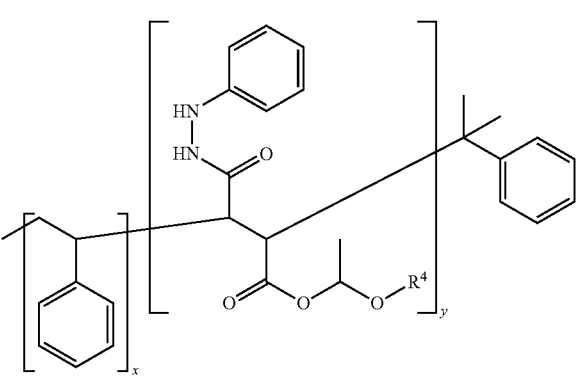

L12

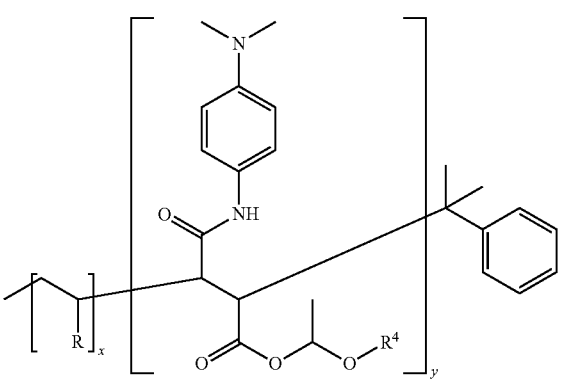

M4

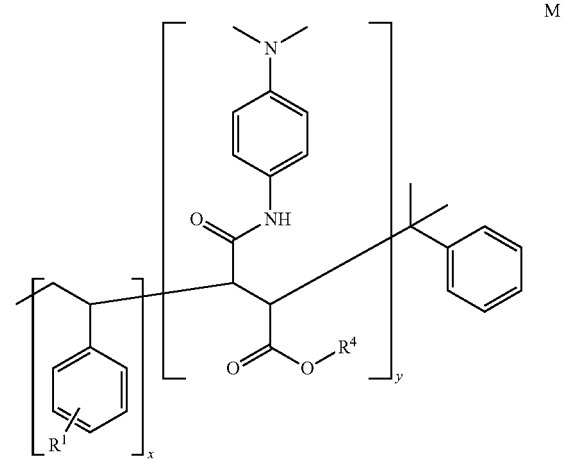

M6 wherein R is selected from a group consisting of H, alkyl having from 1 to about 8 carbon atoms, alkenyl having from 2 to about 8 carbon atoms and aryl having from 6 to about 16 carbon atoms, x, y, z are each individually between 1 and 99 mole %, $R^1$ is a member selected from the group consisting of halogen, hydroxyl, carboxyl, alkyl, alkenyl, alkoxy and alkenoxy; $R^4$ is an adduct of a vinyl ether; n is an integer between 10 and 1,000, and $n^1$ is an integer between 10 and 2,000.

15. A polymer composition selected from the group consisting of:

M7
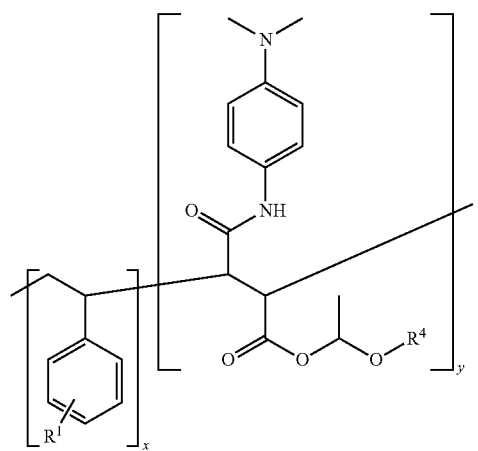

M8
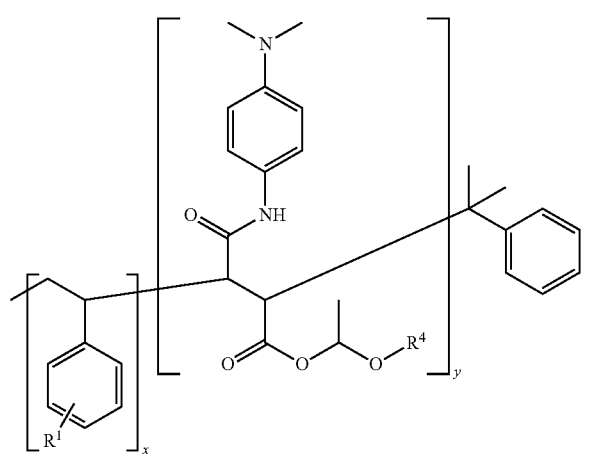

M10
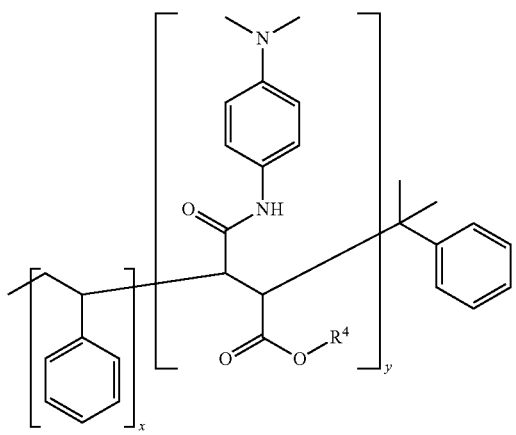

M11
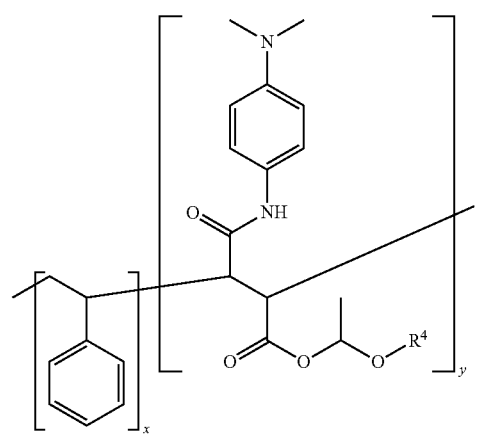

wherein R is selected from a group consisting of H, alkyl having from 1 to about 8 carbon atoms, alkenyl having from 2 to about 8 carbon atoms and aryl having from 6 to about 16 carbon atoms, x, y, z are each individually between 1 and 99 mole %, $R^1$ is a member selected from the group consisting of halogen, hydroxyl, carboxyl, alkyl, alkenyl, alkoxy and alkenoxy; $R^4$ is an adduct of a vinyl ether; n is an integer between 10 and 1,000, and $n^1$ is an integer between 10 and 2,000.

16. A polymer composition selected from the group consisting of:

M9
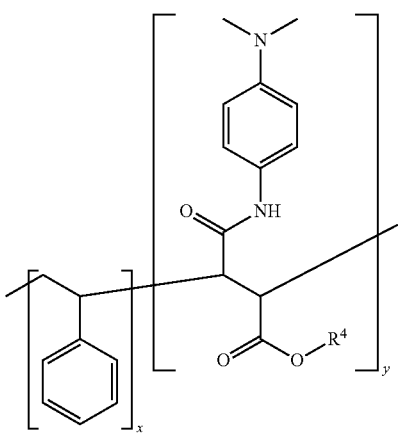

N
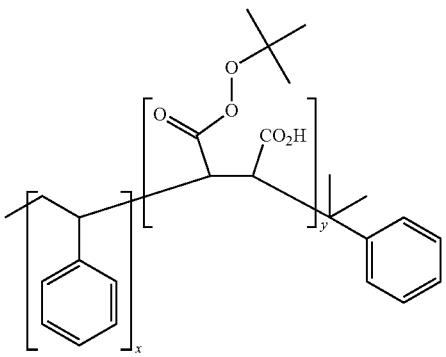

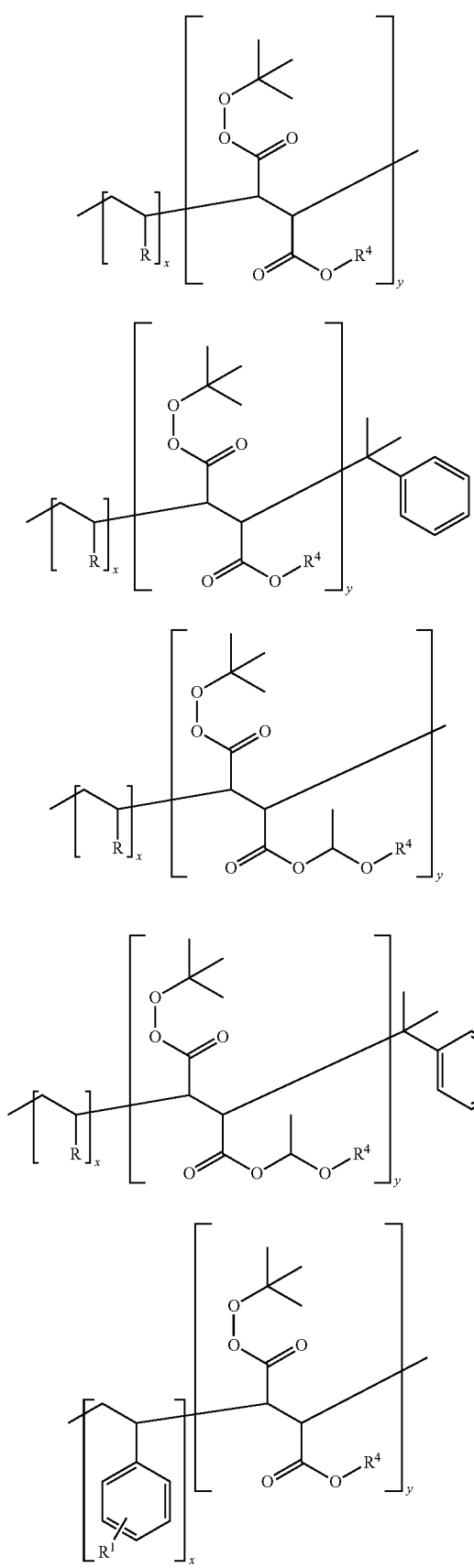
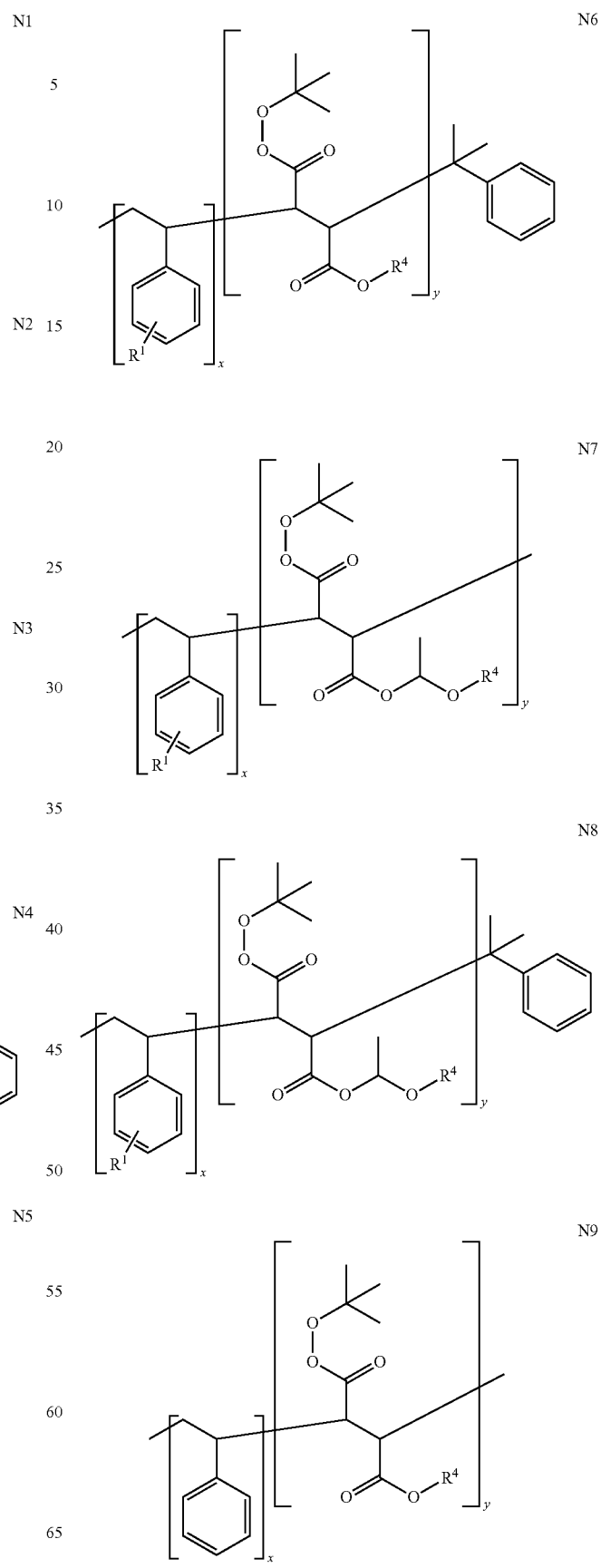

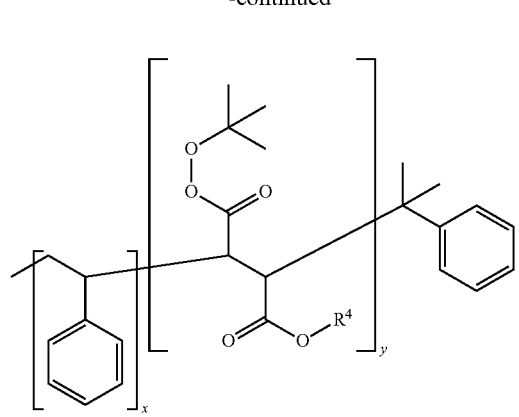
N10

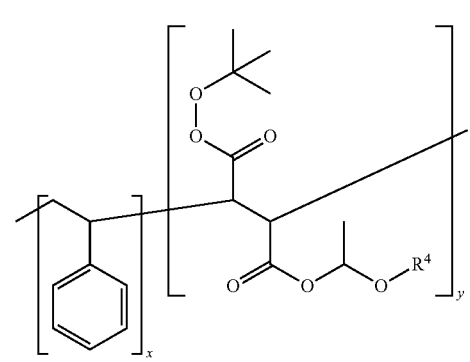
N11

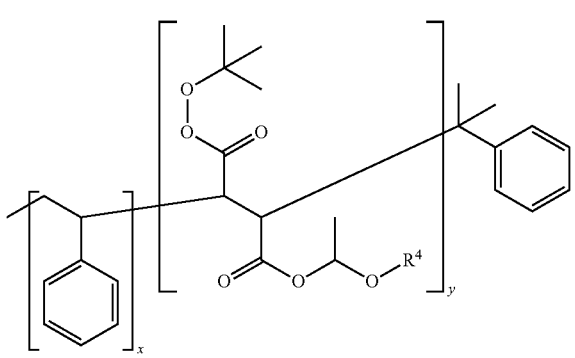
N12

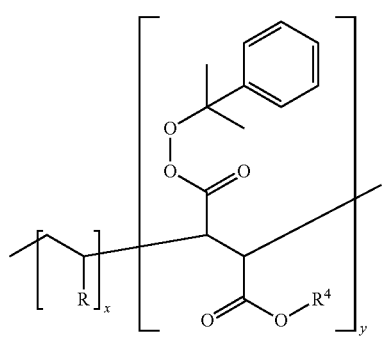
O1

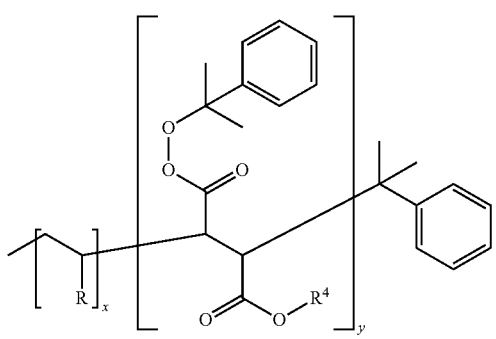
O2

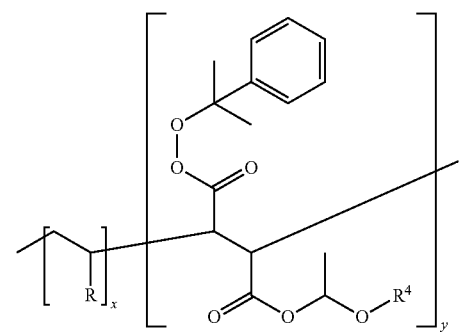
O3

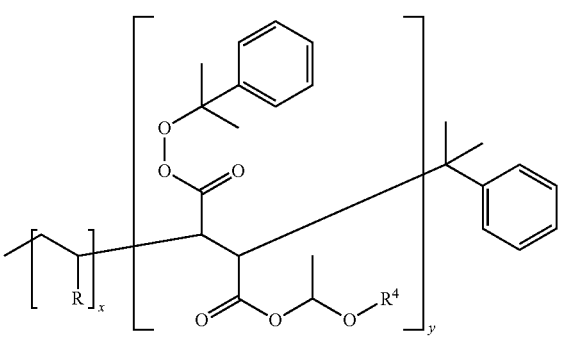
O4 wherein R is selected from a group consisting of H, alkyl having from 1 to about 8 carbon atoms, alkenyl having from 2 to about 8 carbon atoms and aryl having from 6 to about 16 carbon atoms, x, y, z are each individually between 1 and 99 mole %, $R^1$ is a member selected from the group consisting of halogen, hydroxyl, carboxyl, alkyl, alkenyl, alkoxy and alkenoxy; $R^4$ is an adduct of a vinyl ether; n is an integer between 10 and 1,000, and $n^1$ is an integer between 10 and 2,000.

17. A polymer composition selected from the group consisting of:

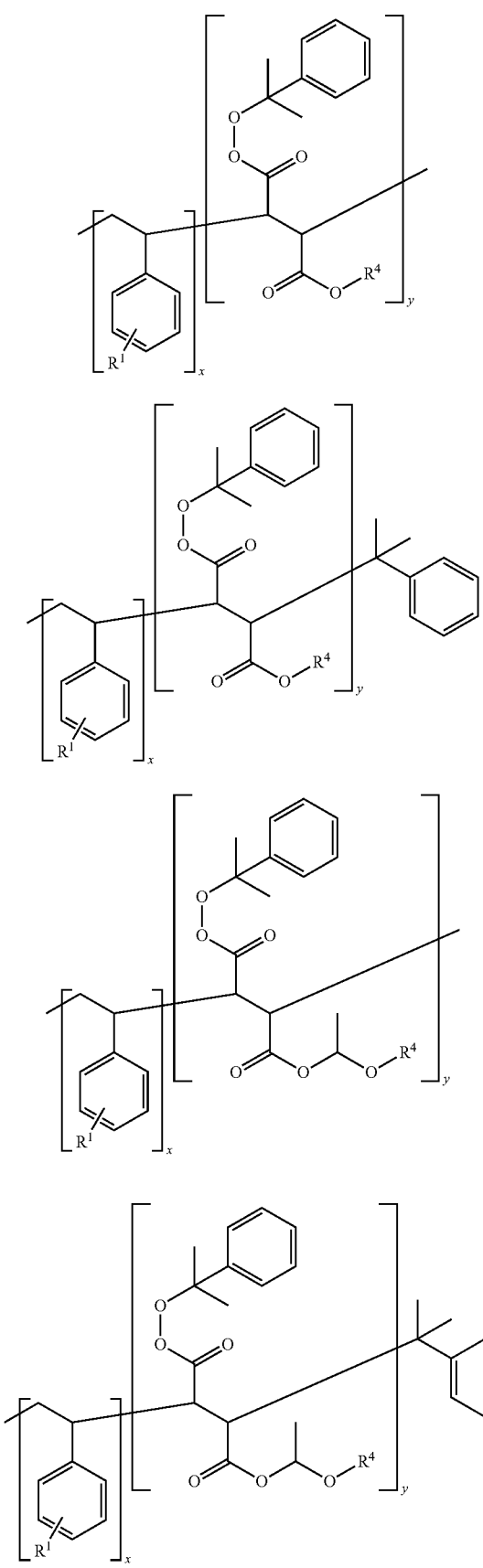
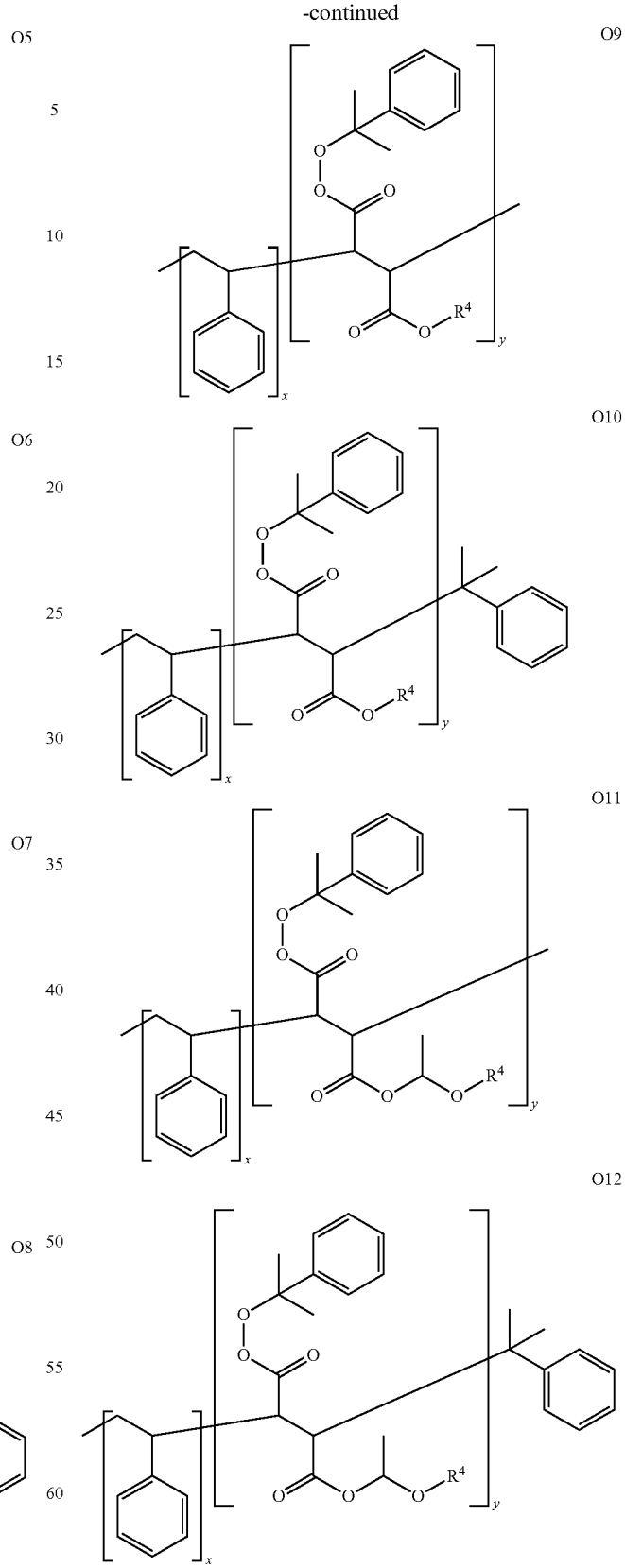
wherein R is selected from a group consisting of H, alkyl having from 1 to about 8 carbon atoms, alkenyl having from 2 to about 8 carbon atoms and aryl having from 6 to about 16 carbon atoms, x, y, z are each individually between 1 and 99 mole %, $R^1$ is a member selected from the group consisting of halogen, hydroxyl, carboxyl, alkyl, alkenyl, alkoxy and alkenoxy; $R^4$ is an adduct of a vinyl ether; n is an integer between 10 and 1,000, and $n^1$ is an integer between 10 and 2,000.
18. A polymer composition selected from the group consisting of:
P1
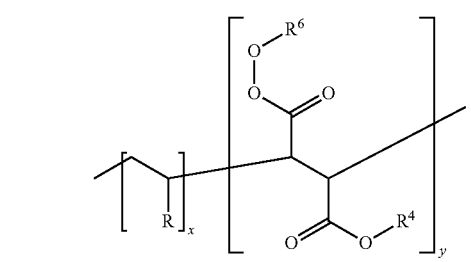
P2
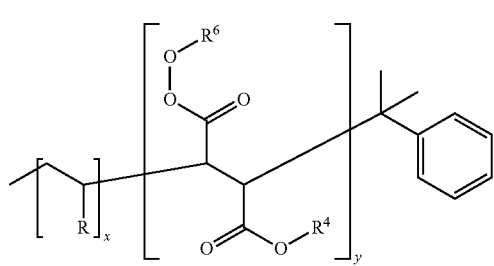
P3
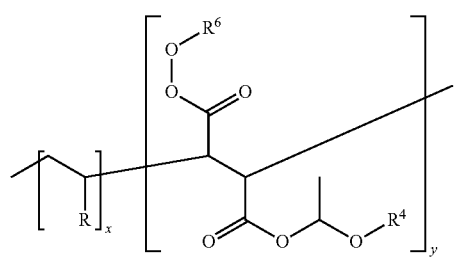
P4
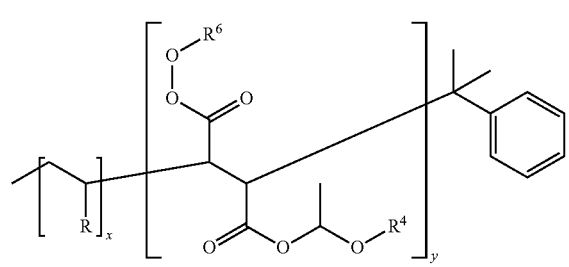
P5
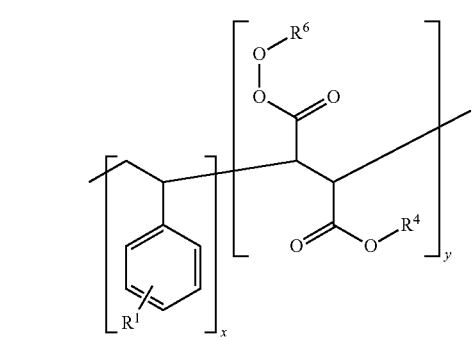
P6
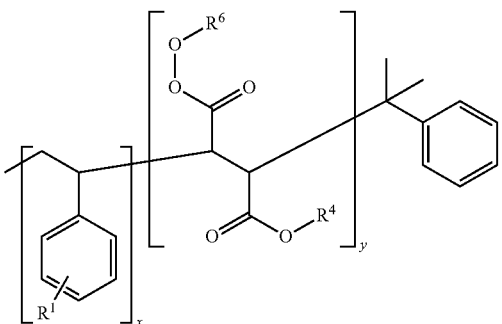
P7
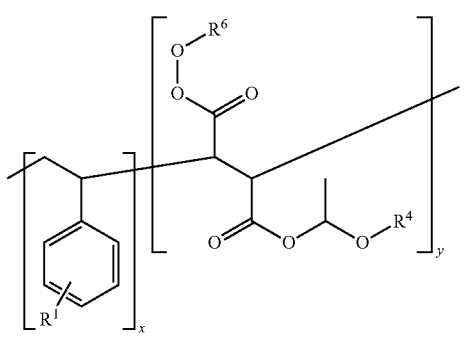
P8
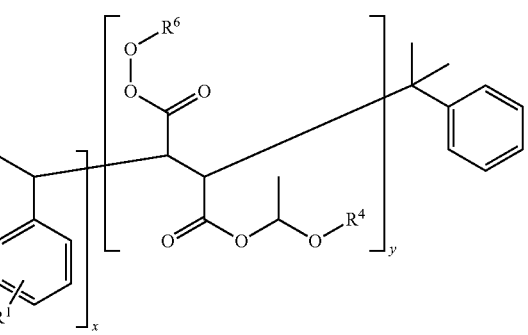
P9
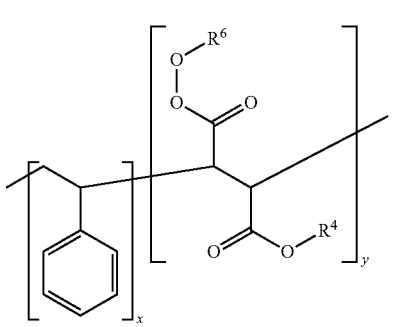

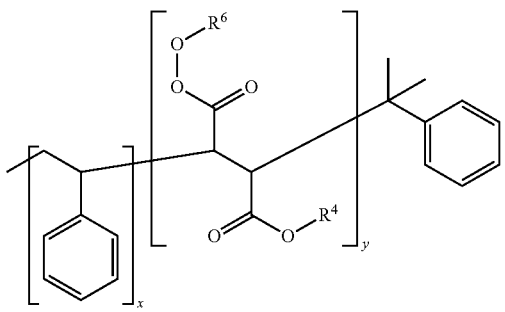

P10

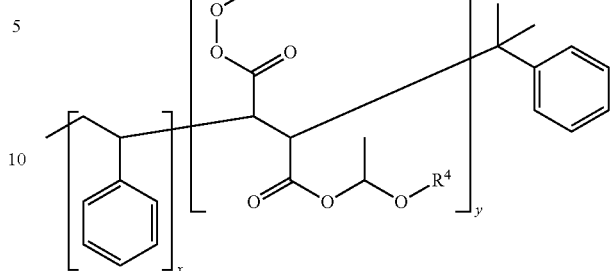

P12

P11 wherein R is selected from a group consisting of H, alkyl having from 1 to about 8 carbon atoms, alkenyl having from 2 to about 8 carbon atoms and aryl having from 6 to about 16 carbon atoms, x, y, z are each individually between 1 and 99 mole %, $R^1$ is a member selected from the group consisting of halogen, hydroxyl, carboxyl, alkyl, alkenyl, alkoxy and alkenoxy; $R^4$ is an adduct of a vinyl ether; $R^6$ is a member selected from the group consisting of linear, branched or cycloaliphatic alkyl and alkenyl, and aryl; n is an integer between 10 and 1,000, and $n^1$ is an integer between 10 and 2,000.

* * * * *